(12) United States Patent
Yamazaki

(10) Patent No.: US 8,736,587 B2
(45) Date of Patent: May 27, 2014

(54) SEMICONDUCTOR DEVICE

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1083 days.

(21) Appl. No.: 12/495,984

(22) Filed: Jul. 1, 2009

(65) Prior Publication Data
US 2010/0007632 A1 Jan. 14, 2010

(30) Foreign Application Priority Data

Jul. 10, 2008 (JP) ................................. 2008-180778

(51) Int. Cl.
*G06F 3/038* (2013.01)

(52) U.S. Cl.
USPC ........................................................ 345/204

(58) Field of Classification Search
USPC .................................................. 345/156–184
See application file for complete search history.

(56) References Cited

U.S. PATENT DOCUMENTS

| | | | | |
|---|---|---|---|---|
| 6,243,069 B1 * | 6/2001 | Ogawa et al. | ................. | 345/102 |
| 6,638,781 B1 * | 10/2003 | Hirakata et al. | ................. | 438/30 |
| 6,692,984 B2 * | 2/2004 | Yonezawa et al. | ............... | 438/96 |
| 6,717,359 B2 * | 4/2004 | Kimura | ......................... | 313/506 |
| 6,724,012 B2 * | 4/2004 | Kimura | ......................... | 257/72 |
| 6,747,290 B2 * | 6/2004 | Yamazaki et al. | ............... | 257/59 |
| 6,747,638 B2 * | 6/2004 | Yamazaki et al. | ............... | 345/207 |
| 6,825,492 B2 * | 11/2004 | Yonezawa et al. | ............... | 257/53 |
| 7,068,254 B2 * | 6/2006 | Yamazaki et al. | ............... | 345/104 |
| 7,161,185 B2 * | 1/2007 | Yamazaki et al. | ............... | 257/88 |
| 7,173,281 B2 * | 2/2007 | Hirakata et al. | ................. | 257/72 |
| 7,224,391 B2 * | 5/2007 | Kimura | ......................... | 348/310 |
| 7,342,256 B2 * | 3/2008 | Yamazaki | ......................... | 257/80 |
| 7,351,605 B2 * | 4/2008 | Yonezawa et al. | ............... | 438/96 |
| 7,365,750 B2 * | 4/2008 | Yamazaki et al. | ............ | 345/531 |
| 7,427,223 B2 * | 9/2008 | Kimura | ......................... | 445/23 |
| 7,511,323 B2 * | 3/2009 | McKee | ......................... | 257/294 |
| 8,482,484 B2 * | 7/2013 | Yamazaki et al. | ............... | 345/4 |
| 2001/0031074 A1 * | 10/2001 | Yamazaki et al. | ............ | 382/124 |
| 2002/0047550 A1 * | 4/2002 | Tanada | ......................... | 315/155 |
| 2002/0074551 A1 * | 6/2002 | Kimura | ......................... | 257/72 |
| 2004/0189567 A1 * | 9/2004 | Kimura | ......................... | 345/87 |
| 2004/0217928 A1 * | 11/2004 | Yamazaki et al. | ............... | 345/81 |
| 2004/0263069 A1 * | 12/2004 | Yamazaki et al. | ............ | 313/506 |
| 2005/0219229 A1 | 10/2005 | Yamaguchi | | |
| 2006/0011913 A1 * | 1/2006 | Yamazaki | ......................... | 257/59 |
| 2006/0151791 A1 * | 7/2006 | Hirakata et al. | ................. | 257/72 |
| 2007/0023754 A1 * | 2/2007 | Zhong et al. | .................... | 257/59 |
| 2007/0108454 A1 * | 5/2007 | Yamazaki et al. | ............... | 257/88 |

(Continued)

FOREIGN PATENT DOCUMENTS

| JP | 2001-292276 | 10/2001 |
|---|---|---|
| JP | 2001-339640 | 12/2001 |

(Continued)

*Primary Examiner* — Amare Mengistu
*Assistant Examiner* — Sarvesh J Nadkarni
(74) *Attorney, Agent, or Firm* — Nixon Peabody LLP; Jeffrey L. Costellia

(57) ABSTRACT

A semiconductor device is provided, which includes a display portion and a driver circuit portion configured to drive the display portion. The display portion includes a first pixel electrode, a second pixel electrode, a plurality of photo sensors between the first pixel electrode and the second pixel electrode, and a plurality of color filters. The driver circuit portion includes a transistor including a single crystal semiconductor layer.

19 Claims, 11 Drawing Sheets

(56) References Cited

U.S. PATENT DOCUMENTS

| | | | |
|---|---|---|---|
| 2007/0268389 A1* | 11/2007 | Kimura | 348/308 |
| 2008/0114926 A1* | 5/2008 | Levi et al. | 711/105 |
| 2008/0129653 A1* | 6/2008 | Yamazaki | 345/55 |
| 2008/0211396 A1* | 9/2008 | Kimura | 313/504 |
| 2008/0283837 A1* | 11/2008 | Tanada | 257/59 |
| 2008/0284710 A1* | 11/2008 | Kimura et al. | 345/98 |
| 2008/0284768 A1* | 11/2008 | Yoshida et al. | 345/208 |
| 2009/0040445 A1* | 2/2009 | Hirakata et al. | 349/123 |
| 2009/0114926 A1* | 5/2009 | Yamazaki | 257/79 |
| 2009/0128529 A1* | 5/2009 | Izumi et al. | 345/207 |
| 2009/0140270 A1* | 6/2009 | Takahashi et al. | 257/88 |

FOREIGN PATENT DOCUMENTS

| | | |
|---|---|---|
| JP | 2002-033823 | 1/2002 |
| JP | 2002-049593 | 2/2002 |
| JP | 2002-182839 | 6/2002 |
| JP | 2002-251164 | 9/2002 |
| JP | 2003-167550 | 6/2003 |
| JP | 2005-037930 | 2/2005 |
| JP | 2005-301373 | 10/2005 |

* cited by examiner

SEMICONDUCTOR DEVICE

BACKGROUND OF THE INVENTION

1. Field of the Invention

The present invention relates to a semiconductor device having a circuit including a thin film transistor (hereinafter referred to as a TFT) and a method for manufacturing the semiconductor device. For example, the present invention relates to an electronic device provided with an electro-optical device typified by a liquid crystal display panel or a light-emitting display device including an organic light-emitting element.

Note that the semiconductor devices in this specification refers to all the devices that can operate by using semiconductor characteristics, and an electro-optical device, a semiconductor circuit, and an electronic device are all included in the category of the semiconductor devices.

2. Description of the Related Art

In recent years, a technique for forming a thin film transistor (TFT) using a semiconductor thin film (having a thickness of approximately several nanometers to several hundreds of nanometers) formed over a substrate having an insulating surface has attracted attention. Thin film transistors are widely applied to electronic devices such as an IC and an electro-optical device. In particular, the rapid development of a thin film transistor as a switching element in an image display device is required.

A resistive touch panel or a capacitive touch panel is sometimes attached to the entire display screen of a commercial liquid crystal display device, and it is possible to perform data input using an attached pen or the like.

In addition, a display which includes a photo sensor so that a display screen also serves as an input region has been suggested. Patent Documents 1 and 2 each disclose a display device having an image capture function with the provision of a contact area sensor that captures images. Patent Document 3 discloses a display device provided with a sensor for controlling the luminance of a light-emitting element.

Further, there has been attempted to provide an authentication function to a personal digital assistant such as a mobile phone. A fingerprint, a face, a handprint, a palm print, a hand vein, or the like is used for authentication. When the authentication function is provided for a portion other than a display portion, the number of components may be increased, so that the weight or price of an electronic device might be increased. Moreover, when a fingerprint or the like is detected by a capacitive touch panel, the conductivity may be changed depending on the state of the finger, so that the detection rate might be decreased.

Reference

Patent Document 1: Japanese Published Patent Application No. 2001-292276

Patent Document 2: Japanese Published Patent Application No. 2001-339640

Patent Document 3: Japanese Published Patent Application No. 2003-167550

SUMMARY OF THE INVENTION

When a display content is selected by touching a display screen with a finger (or a pen), the time until display switching is completed is mainly occupied by the time necessary to detect the position of the finger and the display time for writing new screen data and outputting the data to the display screen. Therefore, in order to smoothly switch display without making a user feel uncomfortable, it is preferable to reduce both the time necessary to detect the position of the finger and the display time for writing new screen data.

The present invention provides a semiconductor device including a display portion in which input processing from a display screen can be precisely performed at high speed. In other words, the present invention provides a semiconductor device including a display portion that can precisely perform position detection at high speed, by which the position where a finger touches a display screen is detected.

Further, the present invention provides a semiconductor device including a display portion that can precisely perform authentication from a display screen at high speed.

Photo sensors are provided in a pixel portion so that a plurality of photo sensors are arranged for one pixel electrode, whereby the resolution of the sensors is increased, and the precise position can be detected.

By using a photo sensor, a display whose display screen also serves as an input region can be realized, and an authentication function can be provided. Moreover, RGB chromaticity of a display portion can be adjusted by the same photo sensor.

In a conventional device, one photo sensor is arranged for one pixel electrode or for three pixel electrodes, for example. Therefore, the resolution of the sensor is equal to or lower than the resolution of image display.

Note that in order to achieve a high aperture ratio of the display portion, the photo sensor is positioned over a wiring. Moreover, the photo sensor is electrically connected to at least one thin film transistor. Further, the pixel electrode is electrically connected to another thin film transistor, which is different from a thin film transistor to which the photo sensor is electrically connected.

Thin film transistors are used for a photo sensor control circuit and a driver circuit for display. These thin film transistors are preferably formed over one substrate in order to reduce the manufacturing costs, and a glass substrate that is inexpensive is preferably used as a substrate.

As a semiconductor layer in the thin film transistor, a semiconductor layer having a crystalline structure is preferably used, and in particular, a single crystal semiconductor layer separated from a semiconductor substrate is preferably used. A thin single crystal semiconductor layer which is formed over a glass substrate by using a semiconductor substrate is used in the thin film transistor connected to the pixel electrode or the thin film transistor connected to the photo sensor. The single crystal semiconductor layer obtained by using a semiconductor substrate has few variations in characteristics, so that a thin film transistor with a high field effect mobility can be realized. Further, when the single crystal semiconductor layer is used in a display driver circuit or a sensor control circuit, the area occupied by the entire circuit can be reduced, and the processing speed can be increased. Moreover, a flash memory, for example, which stores fingerprint data for authentication or the like can be formed using the single crystal semiconductor layer.

As a photoelectric conversion layer in the photo sensor, a single crystal semiconductor layer separated from a semiconductor substrate may be used, but an amorphous semiconductor film or a microcrystalline semiconductor film is preferably used. An advantage in using an amorphous semiconductor film as the photoelectric conversion layer in the photo sensor is that the spectral sensitivity is close to the visibility. Moreover, when a single crystal semiconductor is used for the photoelectric conversion layer in the photo sensor, the sensing time can be reduced than that in the case of using an amorphous semiconductor film or a microcrystalline semiconductor film; however, a wavelength cut filter and/or a correction circuit are/is needed.

One embodiment of the invention disclosed in this specification is a semiconductor device including a display portion having a plurality of pixel electrodes, and a driver circuit portion. The display portion includes a plurality of photo sensors between a first pixel electrode and a second pixel electrode adjacent to the first pixel electrode. The driver circuit portion includes a sensor control circuit for controlling the plurality of photo sensors.

The present invention is to solve at least one of the above objects.

In addition, in the display portion, a red color filter, a green color filter, or a blue color filter is provided at the position overlapping with the pixel electrode, whereby full color display is realized. Moreover, the color filter can be provided to overlap with the plurality of photo sensors arranged between the adjacent pixel electrodes, and the color filter can overlap with the photo sensor and the pixel electrode in the same step using the same alignment marker, which is advantageous to the manufacturing process.

Another embodiment of the invention is a semiconductor device including a display portion having a first pixel electrode overlapping with a red color filter a second pixel electrode overlapping with a green color filter, and a third pixel electrode overlapping with a blue color filter; and three photo sensors between the first pixel electrode and the second pixel electrode. The three photo sensors are a first photo sensor overlapping with the red color filter, a second photo sensor overlapping with the green color filter, and a third photo sensor overlapping with the blue color filter.

In each of the above embodiments, the first pixel electrode may be electrically connected to a thin film transistor, and the photo sensor may be positioned at the position overlapping with a wiring electrically connected to the thin film transistor. The photo sensor mainly senses light from above or below, therefore, when the photo sensor overlaps with the wiring electrically connected to the thin film transistor, the direction of light entering the photo sensor can be limited to one direction.

Note that a photo sensor is an element that uses a photoelectric conversion element such as a photodiode for a light sensing portion and detects the intensity of light based on output voltage obtained by supplying photocurrent generated by the photoelectric conversion element to a resistor. As the photodiode, a Schottky diode, a PIN diode, a PN diode, an avalanche diode, or the like, in which a photoelectric conversion layer is interposed between an anode electrode and a cathode electrode, can be used. The photocurrent generated by the photoelectric conversion element is amplified by an amplifier in order to detect weak light, and a current mirror circuit is used as the amplifier circuit, for example. When light in a wide range of weak light to strong light is detected, the range of amplified photocurrent becomes wider. Therefore, when the photocurrent amplified by external load resistance or the like is converted into voltage, output voltage increases linearly with respect to the illuminance. Thus, when Output voltage is obtained with respect to a wide range of illuminance, the output voltage is several millivolts with respect to weak light and several volts with respect to strong light, and it is difficult to widen the dynamic range of illuminance as a photo sensor because of limitations of circuits (e.g., power supply voltage). Accordingly, in order to obtain a wide dynamic range of illuminance of the photoelectric conversion device, the sensor control circuit may employ a method where output of a voltage value obtained by logarithmic compression (hereinafter the output is referred to as output voltage) is obtained by supplying photocurrent generated by the photoelectric conversion element to a diode. Note that logarithmic compression indicates that a value of current or voltage to be output is obtained as a logarithmic function, with the illuminance of light entering the photoelectric conversion element, that is, a value of photocurrent as a variable.

In addition, a circuit for converting an analog signal into a digital signal may be added to the sensor control circuit so that a digital signal is generated from current that flows from the photodiode depending on the amount of incident light. Moreover, as for the output from the photo sensor, the sensor control circuit may employ a method where output voltage is saturated at low illuminance instead of the method where output voltage increases as the illuminance increases. In the method where output voltage is saturated at low illuminance, an output voltage value decreases as the illuminance increases, which is shown by a downward line when the horizontal axis represents illuminance and the vertical axis represents output voltage. With the method where output voltage is saturated at low illuminance, a wide dynamic range can be obtained even when the resolution in a low illuminance region is increased. Accordingly, in the method where output voltage is saturated at low illuminance, particularly in a low illuminance region, the resolution is high, output voltage with high accuracy can be output, and a wide dynamic range can be obtained.

The resolution of the sensor can be more than twice as high as the resolution of image display, and a semiconductor device including a display portion in which input processing from a display screen can be precisely performed can be realized.

Moreover, high-speed operation can be achieved by using a single crystal semiconductor layer for a sensor control circuit and a display driving circuit, and a semiconductor device including a display portion that can precisely perform position detection at high speed, by which the position where a finger (or a pen) touches a display screen is detected, can be realized.

Further, a semiconductor device including a display portion that can precisely perform authentication from a display screen at high speed can be realizing by using a single crystal semiconductor layer for a flash memory which stores authentication data for personal authentication.

DETAILED DESCRIPTION OF THE INVENTION

An embodiment of the present invention will be described below.

Figure 1:
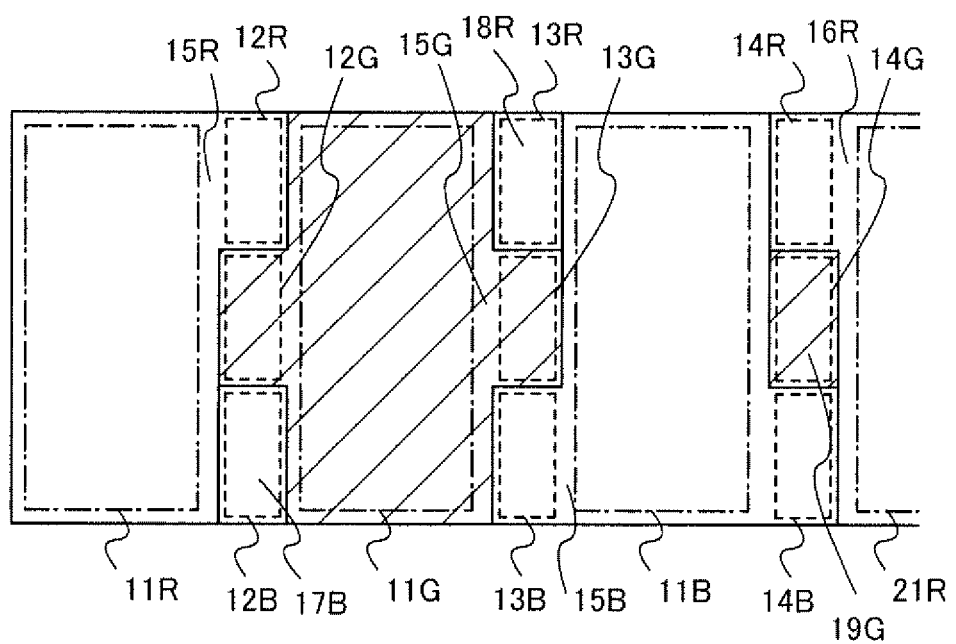
FIG. 1 illustrates an example of a pixel structure.

FIG. 1 illustrates an example of a pixel structure.

The top view of FIG. 1 is a top layout view only illustrating pixel electrodes, photo sensors, and three kinds of color filters for simplification.

As illustrated in FIG. 1, three photo sensors are provided between a first pixel electrode 11R positioned at a region serving as a red display region and a second pixel electrode 11G positioned at a region serving as a green display region which is adjacent to the red display region. A first photo sensor 12R, a second photo sensor 12G, and a third photo sensor 12B overlap with color filters of their respective different colors. A red color filter 15R overlaps with the first pixel electrode 11R and the first photo sensor 12R.

Moreover, three photo sensors are also provided between the second pixel electrode 11G positioned at the region serving as the green display region and a third pixel electrode 11B positioned at a region serving as a blue display region which is adjacent to the green display region. A fourth photo sensor 13R, a fifth photo sensor 13G, and a sixth photo sensor 13B overlap with color filters of their respective different colors. A green color filter 15G overlaps with the second pixel electrode 11G, the second photo sensor 12G, and the fifth photo sensor 13G.

The third photo sensor 12B overlaps with a blue color filter 17B positioned between the red color filter 15R and the green color filter 15G.

Moreover, the third pixel electrode 11B positioned at the region serving as the blue display region is adjacent to a red display region, and three photo sensors are provided between the third pixel electrode 11B and a fourth pixel electrode 21R. A seventh photo sensor 14R, an eighth photo sensor 14G, and a ninth photo sensor 14B overlap with color filters of their respective different colors. A blue color filter 15B overlaps with the third pixel electrode 11B, the sixth photo sensor 13B, and the ninth photo sensor 14B. A red color filter 16R overlaps with the seventh photo sensor 14R and the fourth pixel electrode 21R.

The fourth photo sensor 13R overlaps with a red color filter 11R positioned between the blue color filter 15B and the green color filter 15G.

The eighth photo sensor 14G overlaps with a green color filter 19G positioned between the blue color filter 15B and the red color filter 16R. Further, a black matrix serving as a light-shielding film may be provided between the color filters.

A display portion including a plurality of sensors and pixels which are arranged such that three pixels of RGB are regularly repeated as described above is formed.

When the pixel arrangement illustrated in FIG. 1 is used to form a liquid crystal display device, by performing alignment of the color filter and the pixel electrode, alignment of the color filter and the sensor can be performed at the same time.

Here, an example in which full color display is performed using three colors of RGB is shown; however, the invention is not particularly limited thereto, and full color display device may be performed using four colors of RGBW.

Figure 2A:
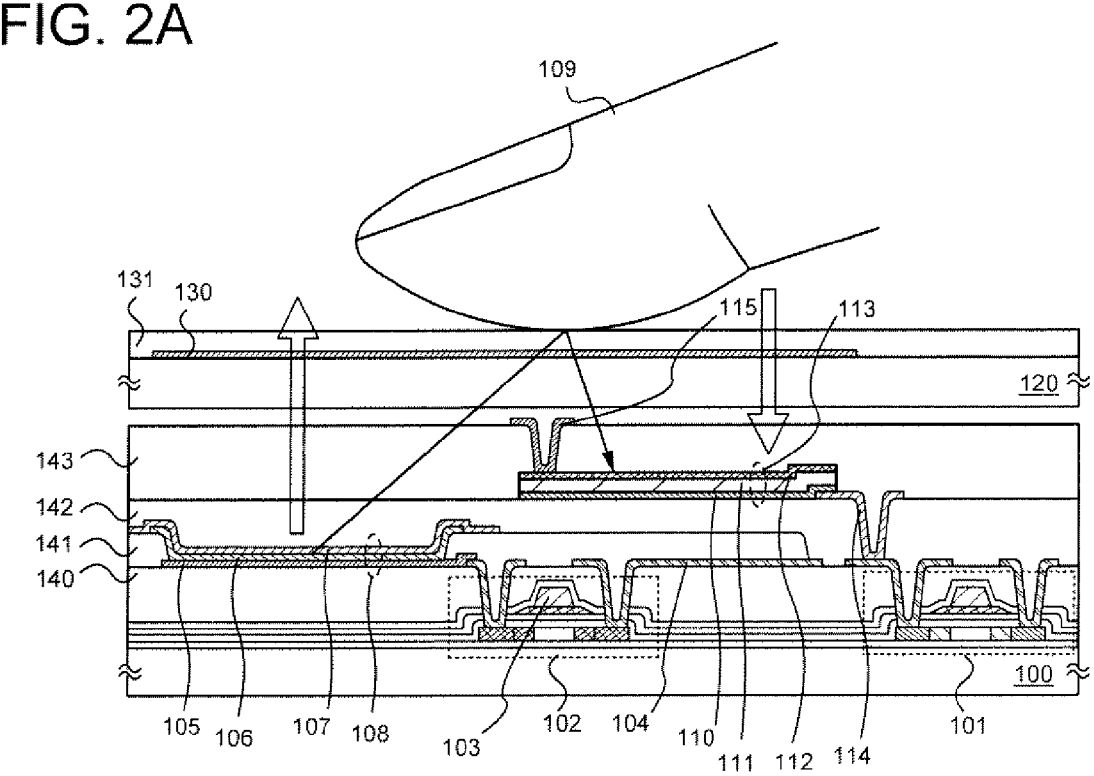
FIGS. 2A and 2B are cross-sectional views of structures of an active matrix light-emitting display device and an active matrix liquid crystal display device, respectively.

FIG. 2A illustrates an example of a cross-sectional view in the case where a display device is formed using an organic light-emitting element.

A transistor 101, an n-type semiconductor 110, an i-type semiconductor (an intrinsic semiconductor) 111, and a p-type semiconductor 112 are provided over a light-transmitting substrate 100. A stack of the n-type semiconductor 110, the i-type semiconductor 111, and the p-type semiconductor 112 corresponds to a photo sensor 113. The i-type semiconductor 111 is a high-impurity semiconductor to which nothing is added.

In the structure illustrated in FIG. 2A, the transistor 101 and a driving transistor 102 are provided over the substrate 100, and an insulating film 140 is provided so as to cover these elements. An insulating film 141 functioning as a bank of an organic light-emitting element 108 is provided over the insulating film 140. An insulating film 142 is provided over the insulating film 141, and an insulating film 143 is provided over the insulating film 142. The organic light-emitting element 108 is provided over the insulating film 140, and the photo sensor 113 is provided over the insulating film 142. The photo sensor 113 is electrically connected to the transistor 101 through a third electrode 114.

Further, the driving transistor 102 including a single crystal semiconductor layer, a first electrode (a pixel electrode) 105, a light-emitting layer 106, and a second electrode (a counter electrode) 107 are provided over the light-transmitting substrate 100. A stack of the first electrode 105, the light-emitting layer 106, and the second electrode 107 corresponds to the organic light-emitting element 108. As the organic light-emitting element 108, a white light-emitting element or three kinds of light-emitting elements of RGB is/are used.

The second electrode 107 and a fourth electrode 115 are formed of a light-transmitting material. The light-transmitting material forming the second electrode 107 and the fourth electrode 115 refers to a transparent conductive film of ITO or the like, or a film which is formed of aluminum or the like and has a thickness such that light can transmit therethrough. Furthermore, the substrate 100 and a counter substrate 120 provided above the photo sensor 113 have light-transmitting properties.

A gap between the counter substrate 120 and the light-transmitting substrate 100 is kept constant by an adhesive layer or a space holding material.

The counter substrate 120 is provided with a color filter 130 and an overcoat layer 131 which covers the color filter 130. The color filter 130 overlaps with both the photo sensor 113 and the organic light-emitting element 108.

Moreover, the photo sensor 113 overlaps with a gate electrode 103 of the driving transistor 102 and a wiring 104 of the driving transistor 102.

The photo sensor 113 utilizes light emission of the organic light-emitting element 108. FIG. 2A illustrates a finger 109 and shows an example of a path of light from the organic light-emitting element 108, which is reflected by the finger 109 which is an object and enters the photo sensor 113. When the light from the organic light-emitting element 108 is reflected by the object and then enters the photo sensor 113, the potential difference between the electrodes of the photo sensor is changed. Then, current flows between the electrodes (the third electrode 114 and the fourth electrode 115) depending on the changed potential difference, and data on the object can be obtained by detecting the amount of flowing current. The obtained data is displayed by the organic light-emitting element 108. In other words, the organic light-emitting element 108 has function of a light source for reading data of the object and a function of displaying images.

The luminance of the organic light-emitting element 108 can be adjusted by using data of external light detected by the photo sensor 113 so that display can be adapted to the environment in which the display device is used.

The display device illustrated in FIG. 2A has a display screen, and a light-emitting display device and an electronic device which are highly functional and have high added value can be provided. In order to perform display and sensing using the display device illustrated in FIG. 2A, the organic light-emitting element 108 is made to perform light emission for display and light emission for sensing at different timings.

Figure 2B:
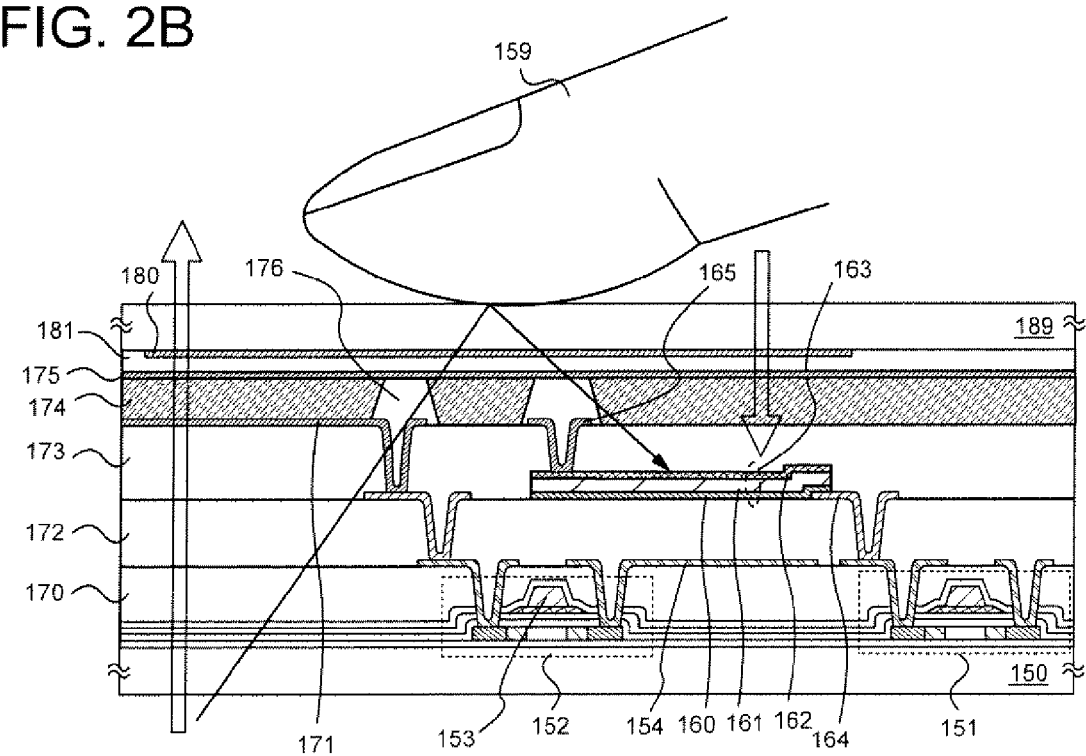

FIG. 2B illustrates an example of a cross-sectional view in the case where a liquid crystal display device is formed.

A transistor 151, an n-type semiconductor film 160, an i-type semiconductor film (an intrinsic semiconductor) 161, and a p-type semiconductor film 162 are provided over a light-transmitting substrate 150. A stack of the n-type semiconductor film 160, the i-type semiconductor film 161, and the p-type semiconductor film 162 corresponds to a photo sensor 163. The i-type semiconductor film 161 is a high-impurity semiconductor to which nothing is added.

In the structure illustrated in FIG. 2B, the transistor 151 and a switching transistor 152 are provided over the substrate 150, and an insulating film 170 is provided so as to cover these elements. An insulating film 172 is provided over the insulating film 170, and an insulating film 173 is provided over the insulating film 172. A pixel electrode 171 is provided over the insulating film 173, and the photo sensor 163 is provided over the insulating film 172. The photo sensor 163 is electrically connected to the transistor 151 through a third electrode 164.

A light-transmitting counter substrate 189 is provided with a counter electrode 175, a color filter 180, and an overcoat layer 181. The counter substrate 189 and the light-transmitting substrate 150 are fixed by a sealing material, and a gap between the substrates is kept by a spacer material 176. A stack of the pixel electrode 171, a liquid crystal layer 174, and the counter electrode 175 corresponds to a liquid crystal element.

The color filter 180 overlaps with both the photo sensor 163 and the pixel electrode 171.

The photo sensor 163 overlaps with a gate electrode 153 of the switching transistor 152 and a source wiring 154 of the switching transistor 152.

Unlike the light-emitting display device in FIG. 2A, the liquid crystal display device is provided with a backlight. For the backlight a cold cathode fluorescent ramp or a white LED having a wider luminance adjustable range than the cold cathode fluorescent ramp can be used. Alternatively, the backlight may be constituted by three kinds of LEDs of RGB. When the backlight is constituted by three kinds of LEDs of RGB, the color filter overlapping with the pixel electrode is not necessary.

The display device illustrated in FIG. 2B has a display screen, and a liquid crystal display device and an electronic device which are highly functional and have high added value can be provided. In order to perform display and sensing using the display device illustrated in FIG, 2B, a backlight for display and a backlight for sensing are made to be lit at different timings. Further, a plurality of kinds of backlights may be provided, and three kinds of LEDs of RGB may be used for the backlight for display and an LED that emits infrared light may be used for the backlight for sensing so as to identify a hand vein. In the case of identifying the hand vein, a single crystal semiconductor layer is used as the i-type semiconductor film 161.

The luminance of the backlight can be adjusted by using data of external light detected by the photo sensor 163 so that display can be adapted to the environment in which the display device is used.

Figure 3:
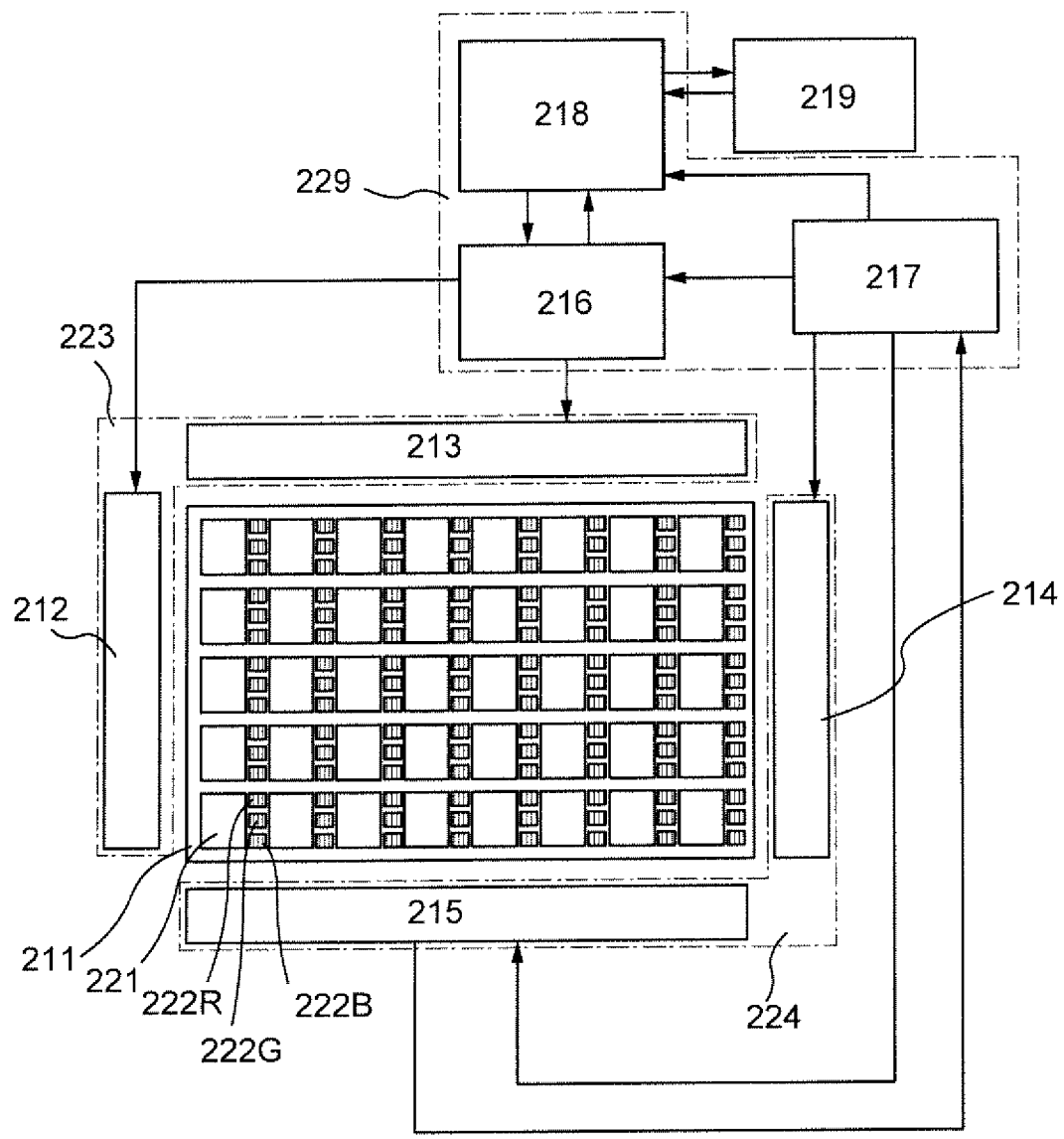
FIG. 3 is a block diagram.

FIG. 3 illustrates an example of a block diagram. A display device that includes a display portion having a display function and an input function and displays moving images including a plurality of frame images, and a method for displaying images will be described below.

The display device includes a display portion 211, and a scan line driver circuit 212 and a data line driver circuit 213 which are electrically connected to the display portion 211. Moreover, the display device includes a display control circuit 216 for controlling the scan line driver circuit 212 and the data line driver circuit 213, and a sensor control circuit 217 for controlling a sensor scan line driver circuit 214 and a sensor data line driver circuit 215. Further, the display device includes an arithmetic processing circuit 218 for controlling the display control circuit 216 and the sensor control circuit 217, and a memory circuit 219 for storing various kinds of data.

The arithmetic processing circuit 218 controls the circuits included in the display device, performs a variety of arithmetic processing and the like, and includes a central processing unit (CPU), an arithmetic circuit for image processing, and the like.

The memory circuit 219 stores data and includes a ROM in which a computer program, a filter for image processing, a lookup table, and the like used by the arithmetic processing circuit 218 are stored; a RAM in which an arithmetic result calculated by the arithmetic processing circuit 218, image data, and the like are stored; and the like.

The display portion 211 includes a plurality of pixel electrodes 221. A transistor photo sensors 222R, 222G, and 222B, and a sensor circuit are provided between the pixel electrodes.

A pixel circuit is connected to the scan line driver circuit 212 through a scan line and connected to the data line driver circuit 213 through a data line. Examples of a display element are an element that changes a polarization state of light passing therethrough, such as a liquid crystal element, and a light-emitting element such as an EL (electroluminescence) element. Alignment of liquid crystal molecules of the liquid crystal element is controlled by the pixel circuit, whereby a polarization state of light passing through the liquid crystal element is controlled so that the amount of transmission light is adjusted to express desired luminance. Alternatively, the brightness of the light-emitting element is controlled by the pixel circuit, and the light-emitting element emits light with desired luminance. In such a manner, the scan line driver circuit 212 and the data line driver circuit 213 form a pixel driver circuit 223 that drives the pixel circuit.

The sensor circuit is connected to the sensor scan line driver circuit 214 through a sensor scan line and connected to the sensor data line driver circuit 215 through a sensor data line. The photo sensor 222 is an element for converting received light into an electric signal, and a photodiode is used, for example. Signals detected by the three photo sensor are output to the sensor data line driver circuit 215 from each pixel in a row specified by a sensor selection signal output from the sensor scan line driver circuit 214. In such a manner, the sensor scan line driver circuit 214 and the sensor data line driver circuit 215 form a sensor driver circuit 224 that drives the sensor circuit.

The display control circuit 216 controls the pixel driver circuit 223 (the scan line driver circuit 212 and the data line driver circuit 213). In accordance with a signal input from the display control circuit 216, the scan line driver circuit 212 outputs a signal to the scan line and the data line driver circuit 213 outputs image data to the data line. In the display portion 211, an image is displayed in accordance with the signals input to the scan line and the data line. For example, the display control circuit 216 includes an AD converter (an analog-digital conversion circuit) that converts analog image data into digital data, a DA converter (a digital-analog conversion circuit) that converts digital image data into analog data, an image processing circuit that performs image processing such as gamma correction, and the like. In the case where display is performed using the light-emitting element, the display control circuit 216 can perform display by a digital method when image data of an image signal input to the display device is a digital video signal. For example, when the display device is a light-emitting device, gradation is expressed by turning on or off the light-emitting element by digital control.

The sensor control circuit 217 controls the sensor driver circuit 224 (the sensor scan line driver circuit 214 and the sensor data line driver circuit 215). In accordance with a signal input from the sensor control circuit 217, the sensor scan line driver circuit 214 outputs a signal to the sensor scan line. The sensor control circuit 217 reads a detection signal input from the display portion 211 to the sensor data line driver circuit 215, from the sensor data line driver circuit 215. The detection signal is analyzed in the sensor control circuit 217 or the arithmetic processing circuit 218 so that the position of the photo sensor to which light is input is detected. In the sensor control circuit 217, an AD converter that converts an analog sensor output signal into a digital sensor output signal may be used, and the digital sensor output signal may be input to the arithmetic processing circuit 218. Further, when the sensor output signal is weak, it is preferable that an amplifier circuit be provided in the sensor control circuit 217 to amplify the sensor output signal and reduce noise.

The display control circuit 216, the sensor control circuit 217, and the arithmetic processing circuit 218 form a display switching circuit 229. The display switching circuit 229 outputs a signal for switching an image displayed on the display portion 211 to the pixel driver circuit 223, based on a detection signal input from the sensor driver circuit 224. In other words, based on the position information of the photo sensor detected by the sensor control circuit 217 or the arithmetic processing circuit 218, the arithmetic processing circuit 218 determines an image displayed on the display portion 211 and controls the display control circuit 216 to change an image displayed on the display portion 211.

In the input device, the transistor in the pixel circuit and the photo sensors 222R, 222G, and 222B of the sensor circuit in the display portion 211, and transistors included in the scan line driver circuit 212, the data line driver circuit 213, the sensor scan line driver circuit 214, and the sensor data line driver circuit 215 are formed over the same substrate. By forming the pixel portion and the driver circuit portion over one substrate as described above, noise can be reduced.

When semiconductor layers in these transistors are single crystal semiconductor layers, variation in characteristics among circuits can be remarkably suppressed as compared to circuits formed using polycrystalline silicon or the like, whereby it is possible to perform position detection at high speed. Moreover, variation in luminance of the pixels can be adjusted, so that the input device with high display performance can be provided.

Further, since a single crystal semiconductor layer is used, a transistor with high mobility, through which a large amount of current flows, can be formed. In the case of using polycrystalline silicon, the channel length L or the like of a transistor is sometimes increased so as to reduce variation in characteristics of transistors; whereas in the case of using a single crystal semiconductor layer, variation in characteristics of transistors can be almost eliminated even when the channel length L is reduced. Thus, the size of the transistor can be reduced, whereby the area occupied by the scan line driver circuit 212, the data line driver circuit 213, the sensor scan line driver circuit 214, and the sensor data line driver circuit 215 can be reduced. Accordingly, increase in size and high definition of the display portion 211 can be realized.

Note that a circuit other than the driver circuits such as the scan line driver circuit 212 can be provided over the same substrate as the display portion 211. Examples of such a circuit are the entire or part of the display control circuit 216, the entire or part of the sensor control circuit 217, the entire or part of the arithmetic processing circuit 218, and the entire or part of the memory circuit 219.

Figure 4A:
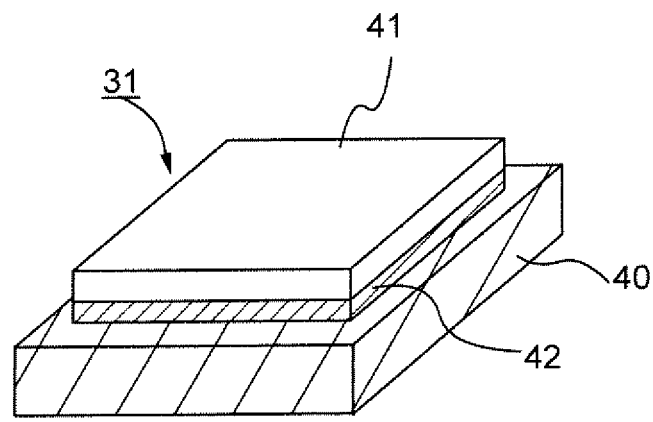
FIGS. 4A to 4C are perspective views each illustrating a substrate including a single crystal semiconductor layer.
Figure 4B:
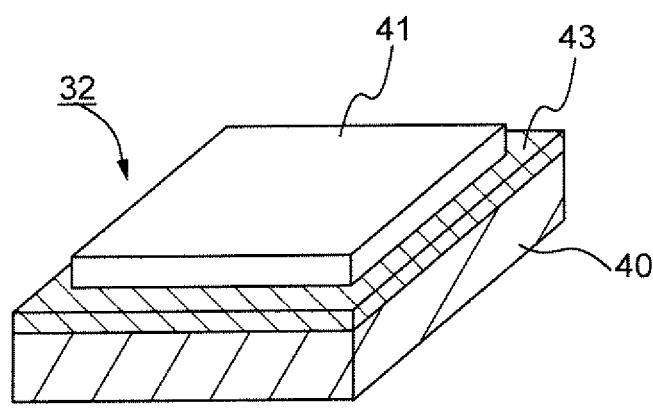
Figure 4C:
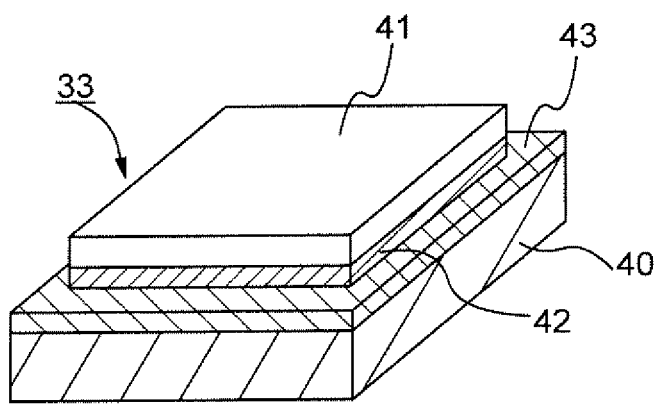

As a substrate for forming transistors included in the above circuit, a light-transmitting substrate over which a single crystal semiconductor layer is provided with an insulating film therebetween can be used. FIGS. 4A to 4C are perspective views each illustrating a structural example of such a substrate.

Substrates 31 to 33 illustrated in FIGS. 4A to 4C are substrates each having an SOI structure, in which a single crystal semiconductor layer is formed over an insulating layer. As illustrated in FIG. 4A, the semiconductor substrate 31 is a substrate in which a single crystal semiconductor layer 41 is fixed to a supporting substrate 40 with a buffer layer 42 therebetween. By bonding a surface of the buffer layer 42 and a surface of the supporting substrate 40 to each other, the single crystal semiconductor layer 41 is fixed to the supporting substrate 40.

As illustrated in FIG. 4B, the substrate 32 is a substrate in which the single crystal semiconductor layer 41 is fixed to the supporting substrate 40 with a buffer layer 43 therebetween. By bonding a surface of the buffer layer 43 and a surface of the single crystal semiconductor layer 41 to each other, the single crystal semiconductor layer 41 is fixed to the supporting substrate 40.

As illustrated in FIG. 4C, the substrate 33 is a substrate in which the single crystal semiconductor layer 41 is fixed to the supporting substrate 40 with the buffer layers 42 and 43 therebetween. By bonding a surface of the buffer layer 42 and a surface of the single crystal semiconductor layer 41 to each other, the single crystal semiconductor layer 41 is fixed to the supporting substrate 40.

A light-transmitting substrate is used as the supporting substrate 40. Specifically, a variety of glass substrates used in the electronics industry, such as substrates formed of aluminosilicate glass, aluminoborosilicate glass, and barium borosilicate glass; quartz substrates; ceramic substrates; and sapphire substrates can be used. A glass substrate is preferably used as the supporting substrate 40.

As the glass substrate, it is preferable to use a substrate with a thermal expansion coefficient of $25 \times 10^{-7}/°$ C. to $50 \times 10^{-7}/°$ C. (preferably $30 \times 10^{-7}/°$ C. to $40 \times 10^{-7}/°$ C.) and a strain point of 580° C. to 700° C. Moreover, in order to suppress contamination of a semiconductor element, the glass substrate is preferably a non-alkali glass substrate. Examples of a material of the non-alkali glass substrate are glass materials such as aluminosilicate glass, aluminoborosilicate glass, and barium borosilicate glass.

The single crystal semiconductor layer 41 is formed by division of a single crystal semiconductor substrate. As the single crystal semiconductor substrate, a commercial semiconductor substrate, for example, a single crystal semiconductor substrate formed of an element of Group 14, such as a single crystal silicon substrate, a single crystal germanium substrate, or a single crystal silicon germanium substrate can be used.

Each of the buffer layers 42 and 43 may have a single-layer structure or a layered structure in which two or more layers are stacked. As an insulating film forming the buffer layers 42 and 43, an insulating film containing silicon or germanium, such as a silicon oxide film, a silicon nitride film, a silicon oxynitride film, a silicon nitride oxide film, a germanium oxide film, a germanium nitride film, a germanium oxynitride film, or a germanium nitride oxide film, can be used. Alternatively, an insulating film formed of metal oxide such as aluminum oxide, tantalum oxide, or hafnium oxide; an insulating film formed of metal nitride such as aluminum nitride; an insulating film formed of metal oxynitride such as an aluminum oxynitride film; or an insulating film formed of metal nitride oxide such as an aluminum nitride oxide film, can be used.

In the following examples, the present invention including the above structures will be described in detail.

EXAMPLE 1

In this example, a method of manufacturing a substrate for forming a display portion, a pixel driver circuit, and a sensor driver circuit will be described.

FIGS. 5A to 5E are cross-sectional views for illustrating a method of manufacturing a glass substrate over which a single crystal semiconductor layer is provided. In this example, as an example of a method for manufacturing a semiconductor substrate, a method for manufacturing a substrate having a layered structure similar to that of the substrate 31 illustrated in FIG. 4A will be described.

First, a single crystal semiconductor substrate 401 is prepared. As the single crystal semiconductor substrate 401, a commercial single crystal semiconductor substrate such as a single crystal silicon substrate or a single crystal germanium substrate can be used, for example. As a commercial single crystal silicon substrate, circular wafers with a diameter of 5 inches (125 mm), 6 inches (150 mm), 8 inches (200 mm), 12 inches (300 mm), and 18 inches (450 mm) are known. Note that the shape of the single crystal semiconductor substrate 401 is not limited to a circular shape, and a single crystal semiconductor substrate processed into a rectangular shape or the like can also be used.

Figure 5A:
FIGS. 5A to 5E are cross-sectional views illustrating steps of manufacturing a single crystal semiconductor layer.

Next, an insulating film 402 is formed on a surface of the single crystal semiconductor substrate 401 (see FIG. 5A).

The insulating film 402 can be formed of a silicon oxide film (SIOx) or a silicon oxynitride film (SiOxNy where x>y) by a chemical vapor deposition method (hereinafter referred to as a CVD method), a sputtering method, or the like. Alternatively, an oxide film formed by oxidizing the single crystal semiconductor substrate 401 may be used. Although the single crystal semiconductor substrate 401 can be oxidized by dry thermal oxidation, it is preferable to add a halogen gas or a halogen compound gas to an oxidizing atmosphere. A typical example of such a gas is HCl. Alternatively, HF, $NF_3$, HBr, $Cl_2$, $ClF_3$, $BCl_3$, $F_2$, $Br_2$, or the like may be used. Moreover, the single crystal semiconductor substrate 401 can be oxidized by surface treatment with ozone water, hydrogen peroxide solution, sulfuric acid hydrogen peroxide mixture, or the like.

Further, it is preferable to use an insulating film having a smooth surface as the insulating film 402. For example, the insulating film 402 is formed so that the average surface roughness (Ra) of the surface is 0.5 nm or less and the root mean square roughness (Rms) is 0.6 nm or less, preferably the average surface roughness is 0.3 nm or less and the root mean square roughness is 0.4 nm or less.

When the insulating film 402 is formed by a CVD method, a silicon oxide film can be formed using organosilane as a raw material, for example. With the use of the silicon oxide film formed using organosilane, the surface of the insulating film 402 can be made smooth.

As the organosilane, a compound containing silicon, such as tetraethoxysilane (TEOS: $Si(OC_2H_5)_4$), tetramethylsilane (TMS: $Si(CH_3)_4$), trimethylsilane (($CH_3)_3SIH$), tetramethylcyclotetrasiloxane (TMCTS), octamethylcyclotetrasiloxane (OMCTS), hexamethyldisilazane (HMDS), triethoxysilane ($SiH(OC_2H_5)_3$), or trisdimethylaminosilane ($SiH(N(CH_3)_2)_3$), can be used.

Figure 5B:
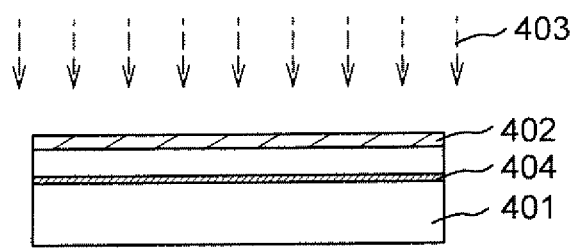

Next, the single crystal semiconductor substrate 401 is irradiated with ion beams 403 including ions accelerated by an electric field through the insulating film 402 to introduce the ions into a region at a predetermined depth from the surface of the single crystal semiconductor substrate 401, whereby a damaged region 404 is formed (see FIG. 5B).

The ion beams 403 are produced by exciting a source gas to generate plasma of the source gas and extracting ions contained in the plasma by an effect of an electric field. In order to introduce ions into the single crystal semiconductor substrate 401, an ion doping method without mass separation can be used. Alternatively, an ion implantation method with mass separation may be used. As the source gas, a hydrogen gas, a halogen gas, a helium gas, or the like can be used.

The depth at which the damaged region 404 is formed can be adjusted by the acceleration energy and the incidence angle of the ion beams 403. The acceleration energy can be adjusted by acceleration voltage, the dose, or the like. The damaged region 404 is formed in a region at almost the same depth as the average depth at which the ions have entered. The thickness of a semiconductor layer to be separated from the single crystal semiconductor substrate 401 is determined by the depth at which the ions have entered. The depth at which the damaged region 404 is formed is equal to or greater than 10 nm and equal to or less than 500 nm, and preferably equal to or greater than 50 nm and equal to or less than 200 nm.

For example, when hydrogen ($H_2$) is used for a source gas and ions are introduced by an ion doping apparatus, plasma containing $H^+$, $H_2^+$, and $H_3^+$ can be produced by exciting a hydrogen gas. The proportion of ion species produced from the source gas can be changed by adjusting a plasma excitation method, pressure in an atmosphere for generating plasma, the supply amount of source gas, or the like.

$H_3^+$ has a larger number of hydrogen atoms than other hydrogen ion species ($H^+$ and $H_2^+$) and thus has large mass. Therefore, when the ions are accelerated with the same energy, $H_3^+$ is introduced into a shallower region of the single crystal semiconductor substrate 401 as compared to $H^+$ and $H_2^+$. By increasing the proportion of $H_3^+$ included in the ion beams 403, the average depth at which the hydrogen ions have entered less varies; thus, in the single crystal semiconductor substrate 401, the hydrogen concentration profile in the depth direction becomes steeper and the peak position of the profile can shift to a shallow region. Accordingly, when an ion doping method is used, $H_3^+$ is contained at 50% or more, and preferably 80% or more of the total amount of $H^+$, $H_2^+$, and $H_3^+$ in the ion beams 403.

When ions are introduced using the hydrogen gas by an ion doping method, the acceleration voltage can be set in the range of 10 kV to 200 kV, and the dose can be set in the range of $1 \times 10^{16}$ ions/cm$^2$ to $6 \times 10^{16}$ ions/cm$^2$. By introducing the hydrogen ions under these conditions, the damaged region 404 can be formed at a depth of 50 nm to 500 nm in the single crystal semiconductor substrate 401, though depending on the ion species and its proportion in the ion beams 403

Figure 5C:
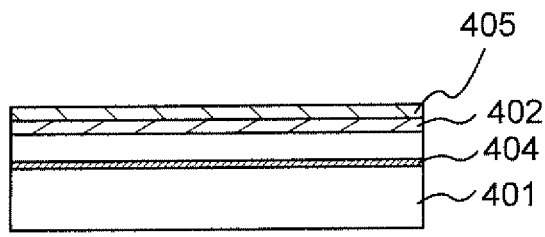

Next, an insulating film 405 is formed over the insulating film 402 (see FIG. 5C). The insulating film 405 functions as a layer attached to a supporting substrate (as a bonding layer).

As the insulating film 405, a silicon nitride film (SiNx), a silicon nitride oxide film (SiNxOy where x>y), or a silicon oxynitride film (SiOxNy where x>y) can be formed. It is preferable to form the silicon nitride film or the silicon nitride oxide film as the insulating film 405 because the insulating film 405 can function as a barrier layer for preventing impurities such as mobile ions and moisture included in the supporting substrate from diffusing into a single crystal semiconductor layer.

Further, since hydrogen bond largely contributes to bonding between the insulating film 405 and the supporting substrate, the insulating film 405 is formed so as to contain hydrogen. By using a silicon nitride film or a silicon nitride oxide film which contains hydrogen as the insulating film 405, strong bonding between the insulating film 405 and the supporting substrate made of glass or the like can be formed by hydrogen bonding using Si—N, Si—OH, N—H, and N—OH bonds. As a method for forming the insulating film 405 containing hydrogen, a plasma CVD method is used. The substrate temperature in film formation is equal to or more than room temperature and equal to or less than 350° C., preferably equal to or more than room temperature and equal to or less than 300° C., and a source gas containing hydrogen is used. By lowering the substrate temperature in film formation, surface roughness of the insulating film 405 to be formed can be reduced. This is because etching reaction on a deposition surface of a film due to hydrogen radicals or the like becomes excessive as the substrate temperature during film formation becomes higher, whereby surface roughness is caused.

More specifically, it is preferable to form a silicon nitride film or a silicon nitride oxide film using a source gas that contains at least a silane gas, an ammonia gas, and a hydrogen gas by a plasma CVD method under the above condition of film deposition temperature. When the silicon nitride oxide film is formed, a nitrogen oxide gas may be added to the source gas. By using an ammonia gas and a hydrogen gas, the insulating film 405 containing hydrogen can be formed. Moreover, by lowering the substrate temperature in film formation, dehydrogenation reaction in film formation is suppressed, and the amount of hydrogen contained in the insulating film 405 can be increased. Accordingly, strong bonding between the insulating film 405 and the supporting substrate can be realized.

Then, a supporting substrate 400 is prepared. As the supporting substrate 400, a light-transmitting substrate is used. Specific examples of a substrate which can be used as the supporting substrate 400 are glass substrates used in the electronics industry, such as substrates formed of aluminosilicate glass, aluminoborosilicate glass, or barium borosilicate glass; and a plastic substrate with a silicon oxide film or a silicon oxynitride film formed on its surface.

When a glass substrate is used as the supporting substrate 400, a large-sized mother glass substrate called the sixth generation (1500 mm×1850 mm), the seventh generation (1870 mm×2200 mm), or the eighth generation (2200 mm×2400 mm) can be used, for example.

Figure 5D:
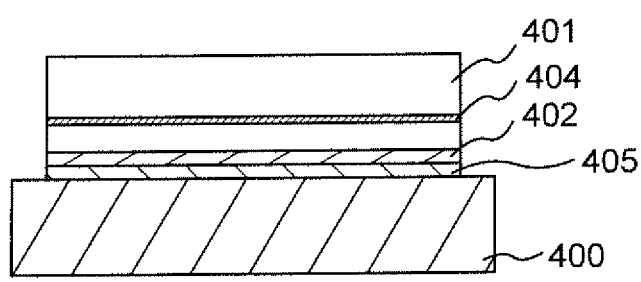

Next, the single crystal semiconductor substrate 401 and the supporting substrate 400 are bonded to each other (see FIG. 5D). The insulating film 405 formed on the surface of the single crystal semiconductor substrate 401 and a surface of the supporting substrate 400 are disposed in contact with each other, whereby bonding is formed. The bonding is formed by Van der Waals forces. By pressure bonding of the supporting substrate 400 and the single crystal semiconductor substrate 401, strong bonding can be formed by hydrogen bonding using Si—H, Si—OH, N—H, and N—OH bonds.

Before the single crystal semiconductor substrate 401 and the supporting substrate 400 are bonded to each other, megasonic cleaning is preferably performed on a bonding surface. More preferably, cleaning of the bonding surface is performed by both megasonic cleaning and ozone water cleaning. This is because by the cleaning treatment, dust such as an organic substance on the bonding surface is removed, and the bonding surface can be hydrophilic.

After the supporting substrate 400 and the insulating film 405 are bonded to each other, heat treatment of 400° C. or less may be performed. By performing the heat treatment, the bonding strength of the supporting substrate 400 and the single crystal semiconductor substrate 401 is increased.

Further, pressure treatment is preferably performed before or at the same time as the heat treatment. The pressure treatment is performed so that pressure is applied perpendicular to the bonding surface. By performing the pressure treatment, even when the surface of the supporting substrate 400 or the surface of the insulating film 405 has unevenness, the unevenness is absorbed by the insulating film 405 with low density, and bonding defects of the single crystal semiconductor substrate 401 and the supporting substrate 400 can be effectively reduced. Note that the temperature of the heat treatment is equal to or less than the allowable temperature limit of the supporting substrate 400, and for example, the heat treatment is performed in the range of 200° C. to 600° C.

Figure 5E:
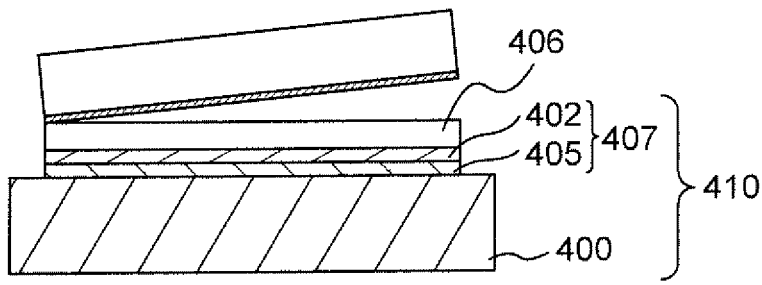

Next, heat treatment is performed, so that part of the single crystal semiconductor substrate 401 is separated from the supporting substrate 400 using the damaged region 404 as a cleavage plane (see FIG. 5E). The temperature of the heat treatment is equal to or more than 400° C. and equal to or less than the strain point of the supporting substrate 400. Note that when a device capable of performing rapid heating, such as an RTA (rapid thermal anneal) device, is used for the heat treatment, the heat treatment can be performed at a temperature higher than the strain point of the supporting substrate 400.

By the heat treatment, microvoids of the damaged region 404 change in volume, so that a crack can be generated in the damaged region 404. In other words, the single crystal semiconductor substrate 401 can be cleaved along the damaged region 404. Accordingly, a single crystal semiconductor layer 406 which has the same crystallinity as the single crystal semiconductor substrate 401 is formed over the supporting substrate 400.

Through the above steps, a glass substrate 410 in which the single crystal semiconductor layer 406 is provided over the supporting substrate 400 with the insulating films 402 and 405 therebetween is formed. The insulating films 402 and 405 serve as a buffer layer 407.

After the single crystal semiconductor substrate 401 is cleaved, laser irradiation treatment in which the single crystal semiconductor layer 406 is irradiated with laser light is preferably performed. This is because when the single crystal semiconductor layer 406 is melted by laser light irradiation, the crystallinity of the single crystal semiconductor layer 406 can be recovered, and the planarity of the top surface of the single crystal semiconductor layer 406 can be improved.

The method for manufacturing a glass substrate is not limited to the above steps. For example, the damaged region 404 may be formed in a region at a predetermined depth from the surface of the single crystal semiconductor substrate 401 by performing ion introduction through the insulating films 402 and 405 after the formation of the insulating film 405, instead of performing ion introduction before the formation of the insulating film 405.

In another method for manufacturing a glass substrate, an insulating film is formed on the supporting substrate 400 side, and this insulating film and the insulating film 405 are bonded to each other, whereby a substrate having the same layered structure as the semiconductor substrate 33 in FIG. 4C can be formed.

Alternatively, in another method for manufacturing a glass substrate, after the damaged region 404 is formed, the insulating film 402 is removed so that a surface of the single crystal semiconductor substrate 401 is exposed. Then, an insulating film is formed on the supporting substrate 400 side, and this insulating film and the single crystal semiconductor substrate 401 are bonded to each other, whereby a substrate having the same layered structure as the semiconductor substrate 32 in FIG. 4B can be formed.

EXAMPLE 2

This example will show an example where a light-emitting display device is formed using the substrate 400 obtained in Example 1.

First, according to Example 1, a single crystal semiconductor layer is formed over the substrate 400 with the buffer layer 407 therebetween.

Next, a top-gate thin film transistor in which the single crystal semiconductor layer serves as an active layer is formed by a known technique. Here, a switching TFT 411 including a gate wiring 415, a driving TFT 408 including a gate electrode 413, and a TFT 409 to be electrically connected to a photo sensor are formed over one substrate. The TFT 409 to be electrically connected to the photo sensor includes a gate wiring 414. As the TFTs, an n-channel TFT or a p-channel TFT can be used individually, which is designed as appropriate depending on the circuit to be used. Moreover, a storage capacitor 412 in which the single crystal semiconductor layer serves as a lower electrode is formed in the same steps as these TFTs. Note that in the storage capacitor 412, the gate electrode 413 of the driving TFT serves as an upper electrode, and an insulating film obtained in the same step as a gate insulating film of the driving TFT is used as a dielectric.

Further, a driver circuit for driving a light-emitting element and a sensor control circuit for driving the photo sensor are also formed over the same substrate using an n-channel TFT or a p-channel TFT.

Contact holes are formed in an insulating film 416 which is one of interlayer insulating films of the TFT, and a source electrode or a drain electrode which is electrically connected to each single crystal semiconductor layer or a connection electrode which is connected to an upper wiring is formed. Moreover, a signal line 419 of the TFT 409, which is electrically connected to the photo sensor; a source signal line 500 of the switching TFT; and a power supply line 417 which is electrically connected to the driving TFT 408 are formed.

Figure 6:
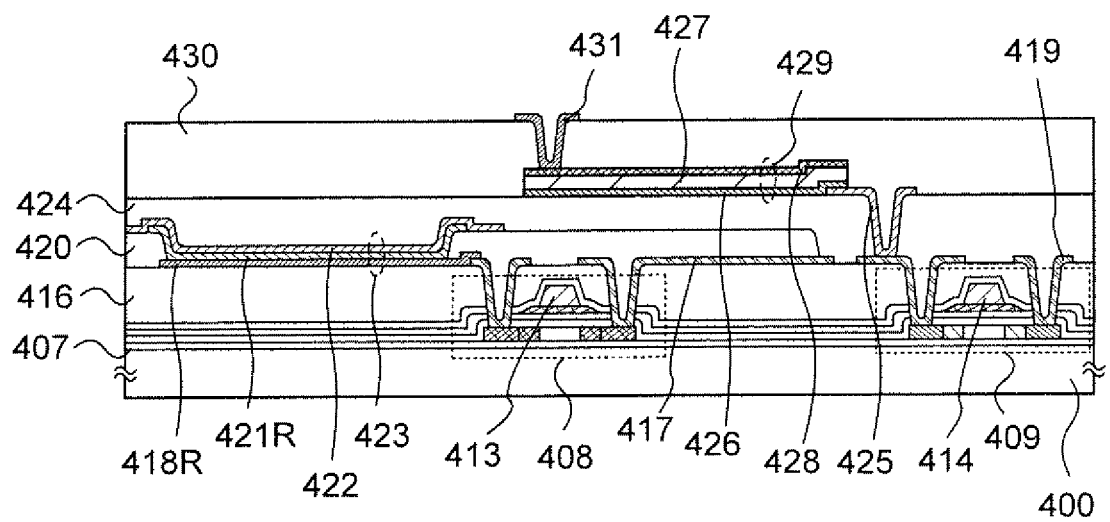
FIG. 6 is a cross-sectional view of a light-emitting display device.

Next, an electrode to serve as a first electrode 418R of the light-emitting element is formed over the insulating film 416. Then, a bank 420 which covers the periphery of the first electrode 418R is formed of an insulator Next, a light-emitting layer is formed on and in contact with the first electrode 418R. For full color display, light-emitting layers of red, blue, and green are formed. The light-emitting layers of red, blue, and green are formed by a known technique such as an evaporation method or an inkjet method, for example. FIG. 6 illustrates an example of forming a red light-emitting layer 421R. Then, a second electrode 422 is formed over the light-emitting layer 421R to have an appropriate pattern. In such a manner, a light-emitting element 423 is formed.

Figure 7:
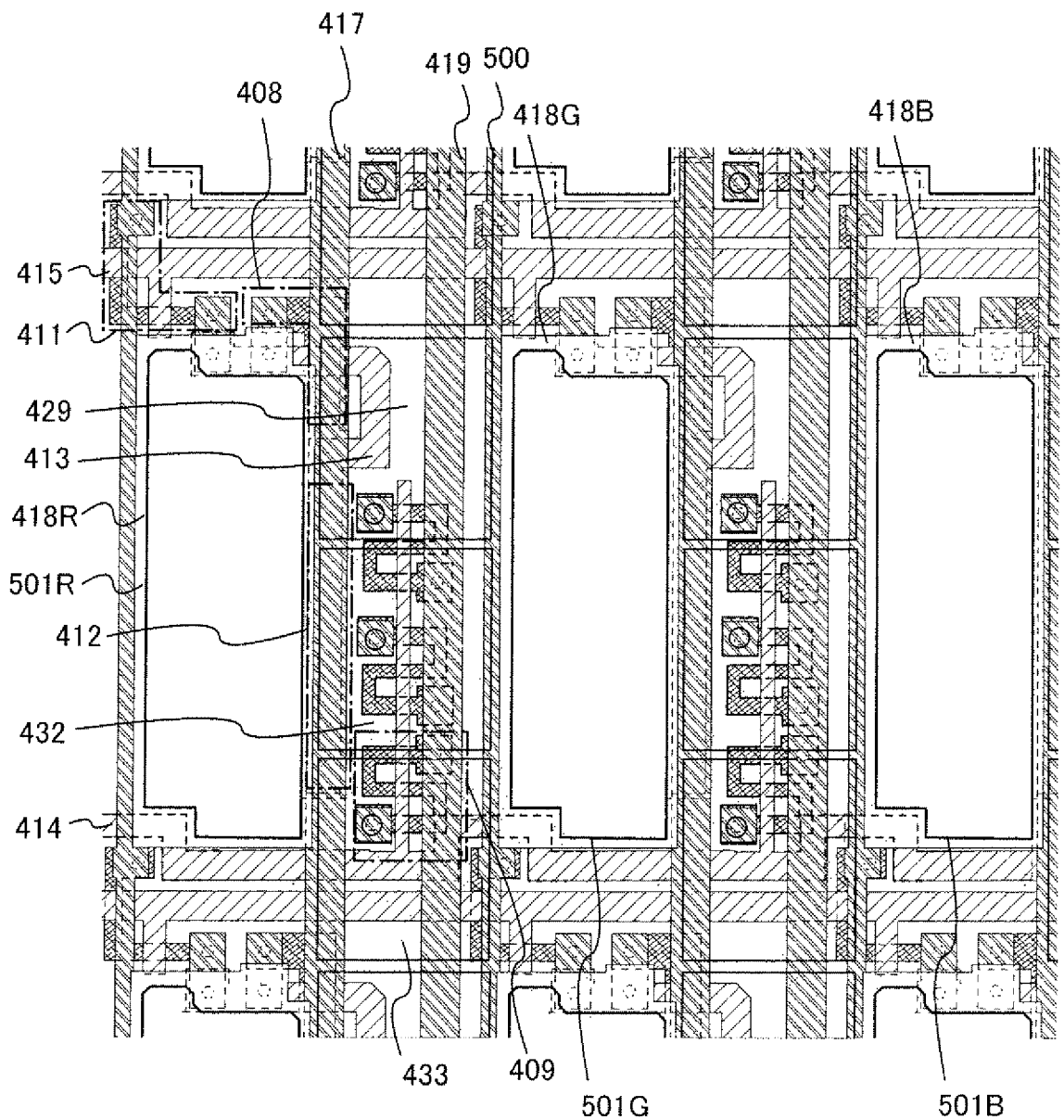
FIG. 7 illustrates an example of a top view of a pixel.

Note that a red light-emitting region 501R corresponds to a region over the first electrode 418R, which does not overlap with the bank 420, that is, a region surrounded by a solid line in FIG. 7. A green light-emitting region 501G corresponds to a region over a first electrode 418G, which does not overlap with the bank 420, that is, a region surrounded by a solid line in FIG. 7. A blue light-emitting region 501B corresponds to a region over a first electrode 418B, which does not overlap with the bank 420, that is, a region surrounded by a solid line in FIG. 7.

Then, an insulating film 424 which covers the second electrode 422 is formed. A material through which light emitted from the light-emitting element 423 passes is used for the insulating film 424, and a light-transmitting conductive film is used for the second electrode 422; accordingly, light emitted from the light-emitting element 423 passes therethrough to be extracted.

Next, a contact hole is formed in the insulating film 424, and a first connection electrode 425 is formed over the insulating film 424.

Then, a photo sensor 429 is formed so as to overlap with at least part of the first connection electrode 425. The first connection electrode 425 is an electrode for electrically connecting the photo sensor 429 and the TFT 409. The photo sensor 429 is constituted by a stack of an n-type semiconductor film 426, an i-type semiconductor film (an intrinsic semiconductor) 427, and a p-type semiconductor film 428. In this example, a microcrystalline silicon film containing phosphorus, an amorphous silicon film, and a microcrystalline silicon film containing boron are stacked as the n-type semiconductor film 426, the i-type semiconductor film 427, and the p-type semiconductor film 428 respectively by a plasma CVD method.

Next, an insulating film 430 which covers the photo sensor is formed. Note that for the insulating film 430, a material through which light emitted from the light-emitting element 423 passes is used. Then, a contact hole is formed in the insulating film 430, and a second connection electrode 431 which is electrically to the p-type semiconductor film 428 is formed over the insulating film 430.

Through the above steps, a light-emitting display device illustrated in FIG. 6 can be manufactured. The light-emitting display device in FIG. 6 includes a photo sensor, and a display portion therein has a touch panel function. The light-emitting display device in FIG. 6 can perform position detection of a plurality of points, that is, multi-touch sensing as well as position detection of only one point.

Further, the display portion of the light-emitting display device illustrated in FIG. 6 can have a fingerprint authentication function or the like.

As illustrated in FIG. 6, the photo sensor 429 is provided so that part of the photo sensor 429 overlaps with the power supply line 417. FIG. 7 is a top view illustrating an example of a pixel structure, in which three photo sensors 429, 432, and 433 are arranged between the first electrode 418R positioned in the red light-emitting region and the first electrode 418G positioned in the green light-emitting region. It is needless to say that FIG. 7 is an example. The number of photo sensors arranged between two adjacent light-emitting elements is not limited to three, and is not particularly limited as long as it is two or more. Further, each of the three photo sensors is connected to its respective thin film transistor, and gate electrodes are common to these thin film transistors in FIG. 7; however, the invention is not particularly limited thereto and different gate wirings may be used. The signal line 419 is shared by the three photo sensors in FIG. 7; however, the invention is not particularly limited thereto and different signal lines may be used. This example shows an example where two TFTs are used for driving the light-emitting element; however, the invention is not particularly limited thereto. Furthermore, the invention shows an example where one TFT is provided to be electrically connected to one photo sensor; however, the invention is not particularly limited thereto. Note that for simplification, the second electrode and the light-emitting layer of the light-emitting element, the first connection electrode, and the second connection electrode are not illustrated in FIG. 7.

Next, sealing may be performed using a substrate or a film for sealing when needed. Moreover, a polarizing film such as a circular polarizing plate or an optical film such as a color filter illustrated in FIG. 2A may be provided when needed.

In the light-emitting display device illustrated in FIG. 6, the luminance of display can be adjusted in accordance with data on external light detected by the photo sensor. In particular, by making the color filters overlap with the photo sensors, a red component, a blue component, and a green component of external light can be distinguished and detected, and the luminance of a red light-emitting element, the luminance of a blue light-emitting element, and the luminance of a green light-emitting element can be adjusted to be the most appropriate luminance for the respective components. Note that when the red component, the blue component, and the green component of external light are distinguished and detected, different signal lines are used by the TFTs connected to the photo sensors.

Here, an example of steps for performing fingerprint authentication using the light-emitting display device illustrated in FIG. 6 will be shown below.

Figure 11:
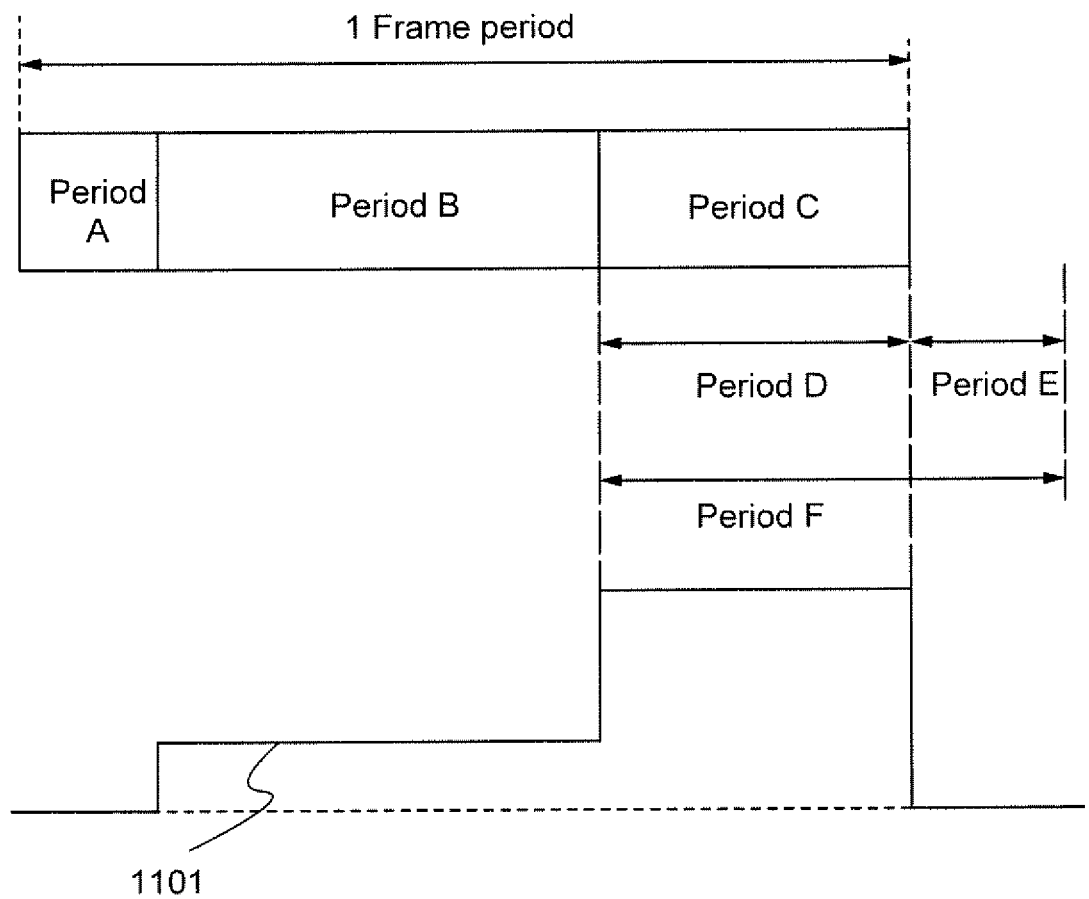
FIG. 11 is a schematic diagram of operations of a light-emitting element and a photo sensor in one frame period.

When a user touches the display portion of the light-emitting display device with the finger, a region touched with the finger is shielded from external light and covered by the finger, so that the user cannot see display in this region. Accordingly, the position of the area shielded from external light is detected using the photo sensor, and further, the luminance of light emitted from a light-emitting element corresponding to the position of the area is increased, and light reflected by the finger is captured by the photo sensor using the strong light emission of the light-emitting element. In other words, after the position of the finger is detected by the photo sensor, part of the display portion performs sensing without performing display, and the other part of the display portion, that is, a region other than the portion touched with the finger performs normal display. As described above, in the light-emitting display device, part of the display screen can emit light for sensing and the other part of the display screen can perform display. In addition, an example where both image display and sensing are performed will be shown as another sensing method. FIG. 11 schematically illustrates operations of a light-emitting element in one frame period. As illustrated in FIG. 11, first, image signals for all the pixels (for one frame) are captured, and after that, light with luminance corresponding to the image signals is emitted to perform display, and then light with high luminance for sensing is emitted. Note that a solid line 1101 in FIG. 11 illustrates an example of light-emitting driving current flowing into the light-emitting element with a current value represented by the vertical axis and time represented by the horizontal axis. Moreover, the photo sensor captures light obtained in such a manner that strong light emitted in a light-emitting period for sensing is reflected by an object and enters the photo sensor and, in a period for outputting a received light signal, outputs received light signal current corresponding to the data obtained in an image capture period. The image capture period can be shortened as the photosensitivity of the photo sensor is higher and as the luminance of the light-emitting element is higher. Note that FIG. 11 shows the example where a light-emitting period for display follows an image obtaining period, and then light reception operations are performed as the light-emitting period for sensing; however, this is just an example of the order of these operations. For example, the following order may be employed: first, an image signal is captured, light with high luminance is emitted for sensing, and after that, the operations in a light reception operation period are performed, and finally, the light-emitting period for display follows.

The thus obtained captured data of the finger is compared to fingerprint data of the user, which is stored in a memory of the light-emitting display device, whereby authentication can be performed.

It is preferable to use a photo sensor whose spectral sensitivity is close to the visibility particularly for detecting the position of an area shielded from external light, and an amorphous silicon film is useful for a photoelectric conversion layer of the photo sensor.

When a photo sensor is provided in each pixel of the display portion, fingerprint authentication can be performed anywhere in the display screen. Further, since the single crystal semiconductor layer is used as the active layer of the TFT electrically connected to the photo sensor, sensing data on a fingerprint or the like can be handled in a short time.

EXAMPLE 3

Figure 8:
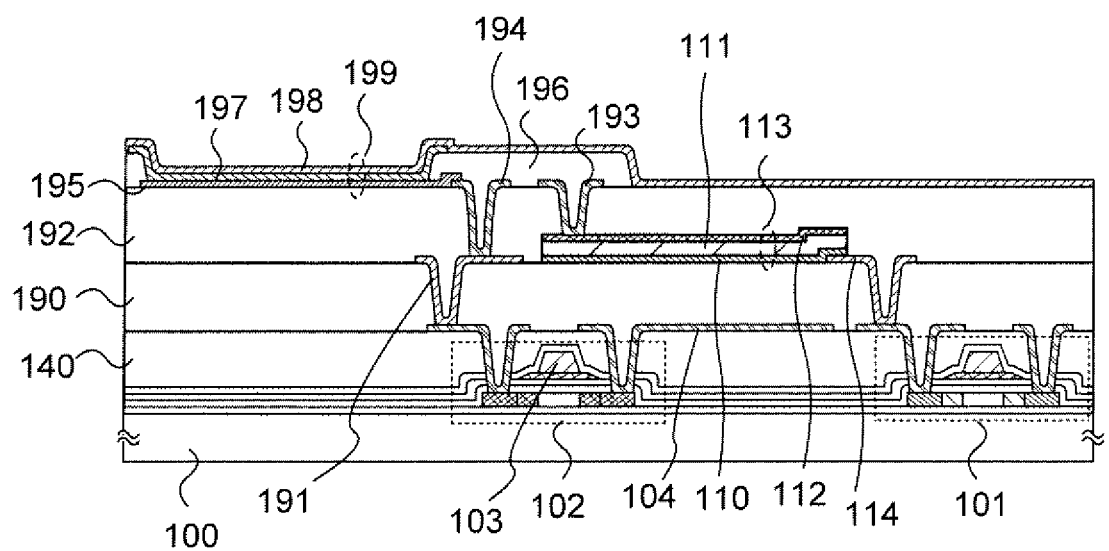
FIG. 8 is a cross-sectional view of a light-emitting display device.

Example 2 shows the example in which the photo sensor is formed over the insulating film which covers the light-emitting element. This example will show an example in which a light-emitting element is formed over an insulating film which covers a photo sensor. FIG. 8 is a cross-sectional view of a light-emitting display device. Note that in FIG. 8, the same portions as those in FIG. 2A are denoted by the same reference numerals for simplification.

First, according to Example 1, a single crystal semiconductor layer is formed over the substrate 100 with a buffer layer therebetween.

Next, a top-gate thin film transistor in which the single crystal semiconductor layer serves as an active layer is formed by a known technique. The transistor 101 and the driving transistor 102 including the gate electrode 103 are formed over one substrate. As the TFTs, an n-channel TFT or a p-channel TFT can be used individually, which is designed as appropriate depending on the circuit to be used.

Further, a driver circuit for driving a light-emitting element and a sensor control circuit for driving the photo sensor are also formed over the same substrate using an n-channel TFT or a p-channel TFT.

Contact holes are formed in the insulating film 140 which is one of interlayer insulating films of the TFT, and a source electrode or a drain electrode which is electrically connected to each single crystal semiconductor layer or a connection electrode which is connected to an upper wiring is formed.

Next, an insulating film 190 which covers the transistor 101 and the driving transistor 102 is formed.

Then, contact holes are formed in the insulating film 190, and the third electrode 114 and a first connection electrode 191 are formed over the insulating film 190. Note that the first connection electrode 191 is electrically connected to the driving transistor 102.

Next, the photo sensor 113 is formed so as to overlap with at least part of the third electrode 114. The third electrode 114 is an electrode for electrically connecting the photo sensor 113 and the transistor 101. The photo sensor 113 is constituted by a stack of the n-type semiconductor 110, the i-type semiconductor (the intrinsic semiconductor) 111, and the p-type semiconductor 112. In this example, an amorphous silicon film containing phosphorus, an amorphous silicon film, and an amorphous silicon film containing boron are stacked as the n-type semiconductor 110, the i-type semiconductor 111, and the p-type semiconductor 112 respectively by a plasma CVD method.

Then, an insulating film 192 which covers the photo sensor 113 and the first connection electrode 191 is formed. Next, contact holes are formed in the insulating film 192, and a second connection electrode 194 and a fourth electrode 193 which is electrically connected to the p-type semiconductor 112 are formed over the insulating film 192.

Then, an electrode to serve as a first electrode 195 of a light-emitting element is formed over the insulating film 192 so as to be in contact with the second connection electrode 194. Next, a bank 196 which covers the periphery of the first electrode 195 is formed of an insulator. Note that the bank 196 is formed to cover the second connection electrode 194 and the fourth electrode 193.

Next, a light-emitting layer 197 is formed on and in contact with the first electrode 195. For full color display, light-emitting layers of red, blue, and green are formed as the light-emitting layers 197. The light-emitting layers of red, blue, and green are formed by a known technique such as an evaporation method or an inkjet method, for example. Then, a second electrode 198 is formed over the light-emitting layer 197. In such a manner, a light-emitting element 199 is formed.

Note that a material through which visible light passes is used for the insulating film 192 so that light enters the photo sensor 113, and a light-transmitting conductive film is used as the second electrode 198; accordingly, visible light is made to pass through the second electrode 198 and to enter the photo sensor 113.

Through the above steps, the light-emitting display device illustrated in FIG. 8 can be manufactured. The light-emitting display device in FIG. 8 includes a photo sensor, and a display portion therein has a touch panel function. The light-emitting display device in FIG. 8 can perform position detection of a plurality of points, that is, multi-touch sensing as well as position detection of only one point.

In addition, sealing may be performed using a substrate or a film for sealing as illustrated in FIG. 2A, when needed. Moreover, a polarizing film such as a circular polarizing plate or an optical film such as a color filter illustrated in FIG. 2A may be provided when needed.

This example can be freely combined with Example 1 or 2.

EXAMPLE 4

This example will show an example in which a liquid crystal display device is formed using the substrate obtained in Example 1. This example will be described with reference to FIG. 2B.

First, according to Example 1, a single crystal semiconductor layer is formed over a substrate with a buffer layer therebetween.

Next, a top-gate thin film transistor in which the single crystal semiconductor layer serves as an active layer is formed by a known technique. Here, the switching transistor 152 including the gate electrode 153 and the transistor 151 which is electrically connected to the photo sensor are formed over one substrate. As the TFTs, an n-channel TFT or a p-channel TFT can be used individually, which is designed as appropriate depending on the circuit to be used. Moreover, a storage capacitor in which the single crystal semiconductor layer serves as a lower electrode is formed in the same steps as these TFTs. Note that in the storage capacitor, a capacitor wiring serves as an upper electrode, and an insulating film obtained in the same step as a gate insulating film of the switching TFT is used as a dielectric.

Contact holes are formed in the insulating film 170 which is one of interlayer insulating films of the TFT, and a source electrode or a drain electrode which is electrically connected to each single crystal semiconductor layer or a connection electrode which is connected to an upper wiring is formed. Moreover, a signal line of the transistor 151, which is electrically connected to the photo sensor, is formed. Further, the source wiring 154 of the switching TFT is formed.

Next, the insulating film 172 which covers the source wiring 154 is formed. Note that since this is an example of a transmissive liquid crystal display device, an insulating material through which visible light passes is used for the insulating film 172. Then, a contact hole is formed in the insulating film 172, and the third electrode 164 is formed over the insulating film 172.

Then, the photo sensor 163 is formed so as to overlap with at least part of the third electrode 164. The third electrode 164 is an electrode for electrically connecting the photo sensor 163 and the transistor 151. The photo sensor 163 is constituted by a stack of the n-type semiconductor film 160, the i-type semiconductor film (the intrinsic semiconductor) 161, and the p-type semiconductor film 162. In this example, a microcrystalline silicon film containing phosphorus, an amorphous silicon film, and a microcrystalline silicon film containing boron are stacked as the n-type semiconductor film 160, the i-type semiconductor film 161, and the p-type semiconductor film 162 respectively by a plasma CVD method.

Next, the insulating film 173 which covers the photo sensor is formed. An insulating material through which visible light passes is also used for the insulating film 173. Then, a contact hole is formed in the insulating film 173, and the pixel electrode 171 and a fourth electrode 165 are formed over the insulating film 173.

Next, a columnar spacer is provided over the insulating film 173. Note that a spherical spacer may be used instead of the columnar spacer.

Then, when TN liquid crystal or the like is used, an alignment film is applied to the pixel electrode 171, and rubbing treatment is performed. Next, the light-transmitting counter substrate 189 provided with the counter electrode 175, the color filter 180, and the overcoat layer 181 is prepared and attached to the substrate 150 using a sealing material. Before the attachment, an alignment film is also applied to the counter substrate 189, and rubbing treatment is performed. The liquid crystal layer 174 is provided between the pair of substrates by a liquid crystal dropping method or a liquid crystal injection method.

Alternatively, blue-phase liquid crystal for which an alignment film is not necessary may be used. The blue phase is a kind of liquid crystal phase and appears just before phase transition from a cholesteric phase to an isotropic phase when temperature of cholesteric liquid crystal rises. Since the blue phase appears only in a narrow temperature range, a liquid crystal composition in which 5 wt. % or more of a chiral material is mixed is used for the liquid crystal layer 174 in order to improve the temperature range. As for the liquid crystal composition which contains blue-phase liquid crystal and the chiral material, the response speed is as high as 10 μs to 100 μs, alignment treatment is not necessary due to optical isotropy, and viewing angle dependence is low.

In the liquid crystal display device, one frame period is a cycle for processing sensing data, and one position where touched or fingerprint data is detected in approximately 13 ms. Note that a display period for one screen is referred to as one frame period, and one frame period corresponding to one time axis is divided to produce a plurality of subframe periods. When one frame period is divided into two subframe periods, a subframe period is half of one frame period (i.e., 1/120 seconds). In the liquid crystal display device, for example, an image signal is supplied to pixels once to perform display in one subframe period of the two subframe periods, and a reset signal is supplied to instantaneously perform white display on the entire screen in the other subframe period. An object is irradiated with light of a backlight at the time of white display on the entire screen, and the reflected light is sensed by the photo sensor. In that case, the human eye cannot recognize change of gray level in one subframe period. Thus, for the human eye, the gray level by the image signal and white display on the entire screen are combined, and the gray level in one frame period is higher than the gray level by the image signal. Therefore, it is preferable to compensate the image signal to obtain a desired gray level even when the gray level by the image signal and white display on the entire screen are combined.

Further, in the case of using a backlight, the backlight serves as a light source for sensing by the photo sensor. Light from the light source may be weak because a polarizing plate or the like is used, so that the intensity of light might be reduced before the light enters the photo sensor. Therefore, it is preferable to add a circuit for converting an analog signal into a digital signal to a sensor control circuit so that the sensor control circuit employs a method where output voltage is saturated at low illuminance. With the method where output voltage is saturated at low illuminance, particularly in a low illuminance region the resolution is high, output voltage with high accuracy can be output particularly in a low illuminance region, and a wide dynamic range can be obtained.

This example can be freely combined with Example 1.

EXAMPLE 5

The present invention can be applied to an electronic device provided with a display portion. Examples of such electronic devices are cameras such as video cameras and digital cameras, navigation systems, audio reproducing devices (e.g., portable digital music players, car audio systems, and audio component sets), notebook computers, game machines, portable information terminals (e.g., mobile computers, mobile phones, mobile game machines, and e-book readers), and image reproducing devices provided with a recording medium (specifically, a device which reproduces a recording medium such as a digital versatile disc (DVD) and has a display for displaying the reproduced image).

Figure 9A:
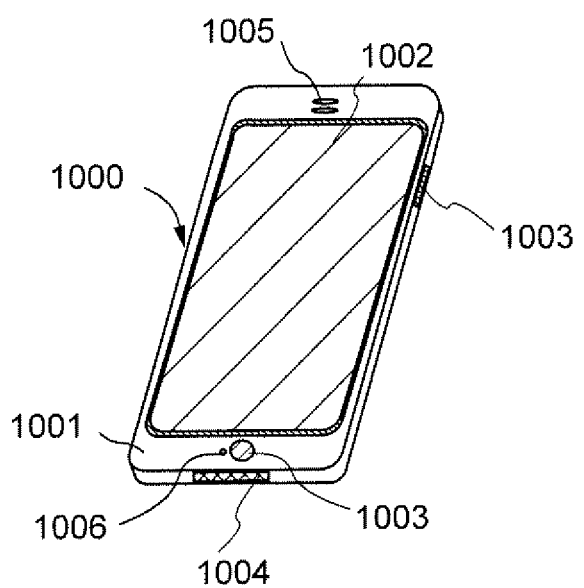
FIGS. 9A and 9B each illustrate an example of an electronic device.

First, an example in which a display device of the present invention is applied to a PDA will be described. FIG. 9A is an external view of a PDA. In a PDA 1000, the system illustrated in FIG. 1 is incorporated in a housing 1001. The PDA 1000 includes a display portion 1002, an operation button 1003, an external connection port 1004, a speaker 1005, and a microphone 1006. By touching the display portion 1002 with a pen, a finger, or the like, data can be input to the PDA 1000.

There are mainly three screen modes of the display portion 1002. The first mode is a display mode mainly for displaying an image. The second mode is an input mode mainly for inputting data such as text. The third mode is a display-and-input mode in which two modes of the display mode and the input mode are mixed.

Figure 9B:
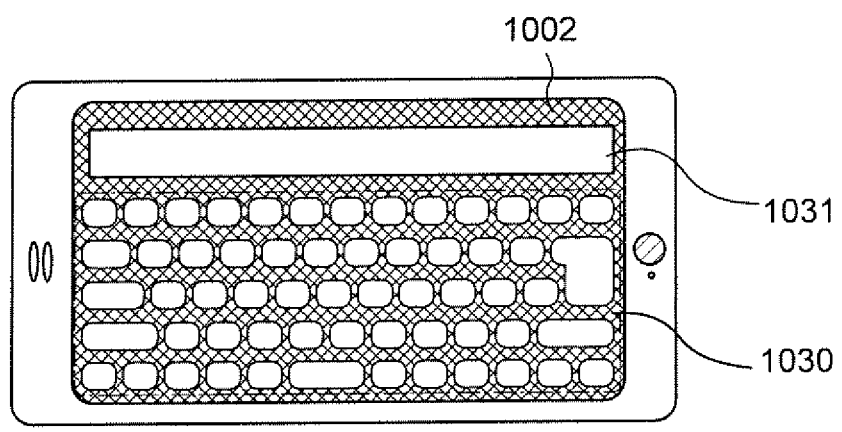

FIG. 9B is a front view of the PDA for illustrating a screen in the input mode. As illustrated in FIG. 9B, a keyboard 1030 is displayed on the display portion 1002, and letters input from the keyboard 1030 which is surrounded by dotted lines are displayed on a screen 1031. Since a letter input operation precedes in the input mode, the keyboard 1030 is displayed on most part of the screen in the display portion 1002. Key arrangement of the keyboard 1030 is changed depending on a language to be used.

When a detection device including a sensor for detecting inclination, such as a gyroscope or an acceleration sensor, is provided inside the PDA 1000, display on the screen of the display portion 1002 can be automatically switched by determining the direction of the PDA 1000 (whether the PDA 1000 stands upright or is laid down on its side).

Further, the screen modes are switched by touching the display portion 1002 or operating the operation button 1003 in the housing. Alternatively, the screen modes can be switched depending on kinds of images displayed on the display portion 1002. For example, when a signal for an image displayed on the display portion is data of moving images, the screen mode is switched to the display mode. When the signal is text data, the screen mode is switched to the input mode.

Moreover, in the input mode, when input by touching the display portion 1002 is not performed within a specified period while a signal detected by a photo sensor in the display portion 1002 is detected, the screen mode may be controlled so as to be switched from the input mode to the display mode.

The display portion 1002 can also function as an image sensor. For example, an image of a palm print, a fingerprint, or the like is taken by touching the display portion 1002 with the palm or the finger, whereby authentication can be performed. Further, when a backlight that emits near infrared light or a light source for sensing that emits near infrared light is used in the display portion, an image of a finger vein, a palm vein, or the like can be taken.

Figure 10A:
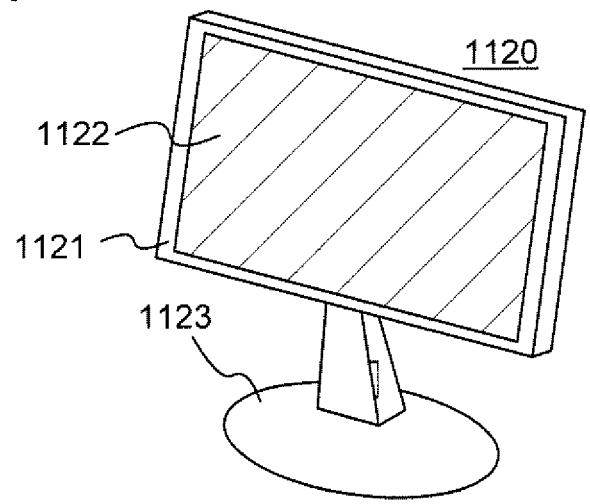
FIGS. 10A and 10B each illustrate an example of an electronic device.
Figure 10B:
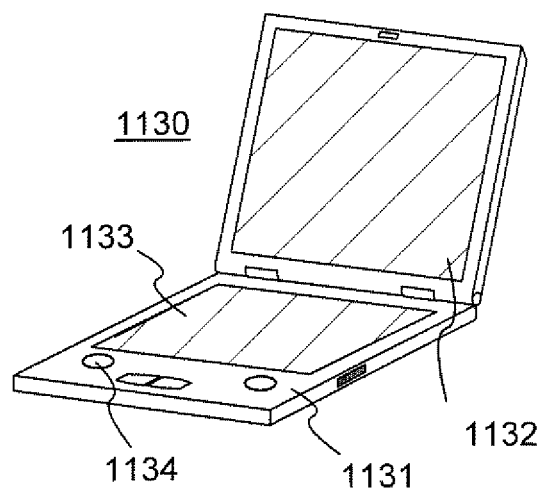

The display device of the present invention can be applied to a variety of electronic devices including a display portion as well as the PDA. FIGS. 10A and 10B illustrate examples of such electronic devices.

FIG. 10A is an external view of a monitor 1120. The monitor 1120 includes a housing 1121, a display portion 1122, a support base 1123, and the like. The display device of the present invention is incorporated in the housing 1121. A plurality of photo sensors are provided in a pixel of the display portion 1122. The display portion 1122 has a display function and a data input function.

FIG. 10B is an external view of a portable game machine 1130. The game machine 1130 includes a housing 1131, a first display portion 1132, a second display portion 1133, an operation button 1134, and the like. The display device of the present invention is incorporated in the housing 1131. A photo sensor is provided in a pixel of the first display portion 1132 or the second display portion 1133, and the first display portion 1132 or the second display portion 1133 has a display function and a data input function. A keyboard is displayed on the second display portion 1133, and letters input by touching the keyboard with a finger, a pen, or the like can be displayed on the first display portion 1132 or the second display portion 1133. Accordingly, it is possible to use the portable game machine 1130 as a notebook personal computer by using the second display portion 1133 on which the keyboard is displayed and data input can be performed by being touched.

This example can be freely combined with any one of Embodiment and Examples 1 to 4.

This application is based on Japanese Patent Application serial no. 2008-166334 filed with Japan Patent Office on Jun. 25, 2008, the entire contents of which are hereby incorporated by reference.

What is claimed is:
1. A semiconductor device comprising:
a display portion including a first pixel electrode, a second pixel electrode, a plurality of photo sensors between the first pixel electrode and the second pixel electrode, a first color filter overlapping with the first pixel electrode, and a second color filter overlapping with the second pixel electrode, wherein each of the first color filter and the second color filter is overlapped with two photo sensors selected from the plurality of photo sensors, and wherein a top-view shape of the first color filter is different from a top-view shape of the second color filter.

2. The semiconductor device according to claim 1, wherein the plurality of photo sensors are overlapped with a wiring electrically connected to a transistor.

3. The semiconductor device according to claim 1, wherein the display portion includes a liquid crystal element.

4. The semiconductor device according to claim 1, wherein the display portion includes a light-emitting element.

5. The semiconductor device according to claim 1, wherein the display portion includes a light-emitting element, and wherein the light-emitting element is overlapped with one of the first color filter and the second color filter.

6. The semiconductor device according to claim 1, wherein each of the first color filter and the second color filter is one of a red color filter, a green color filter, and a blue color filter.

7. The semiconductor device according to claim 1, wherein a photoelectric conversion layer of each of the plurality of photo sensors includes an amorphous semiconductor layer or a microcrystalline semiconductor layer.

8. A semiconductor device comprising:
a display portion including a first pixel electrode, a second pixel electrode, a plurality of photo sensors between the first pixel electrode and the second pixel electrode, a first color filter overlapping with the first pixel electrode, and a second color filter overlapping with the second pixel electrode; and
a driver circuit portion configured to drive the display portion,
wherein the driver circuit portion includes a transistor including a first single crystal semiconductor layer,
wherein each of the first color filter and the second color filter is overlapped with two photo sensors selected from the plurality of photo sensors,
wherein a top-view shape of the first color filter is different from a top-view shape of the second color filter, and
wherein a photoelectric conversion layer of each of the plurality of photo sensors includes a second single crystal semiconductor layer.

9. The semiconductor device according to claim 8, wherein the plurality of photo sensors are overlapped with a wiring electrically connected to the transistor.

10. The semiconductor device according to claim 8, wherein the display portion includes a liquid crystal element.

11. The semiconductor device according to claim 8, wherein the display portion includes a light-emitting element.

12. The semiconductor device according to claim 8, wherein the display portion includes a light-emitting element, and wherein the light-emitting element is overlapped with one of the first color filter and the second color filter.

13. The semiconductor device according to claim 8, wherein each of the first color filter and the second color filter is one of a red color filter, a green color filter, and a blue color filter.

14. A semiconductor device comprising:
a display portion including a first pixel electrode, a second pixel electrode, a plurality of photo sensors between the first pixel electrode and the second pixel electrode, a first color filter overlapping with the first pixel electrode, and a second color filter overlapping with the second pixel electrode,
wherein each of the first color filter and the second color filter is overlapped with two photo sensors selected from the plurality of photo sensors.

15. The semiconductor device according to claim 14, wherein the display portion includes a liquid crystal element.

16. The semiconductor device according to claim 14, wherein the display portion includes a light-emitting element.

17. The semiconductor device according to claim 14, wherein the display portion includes a light-emitting element, and wherein the light-emitting element is overlapped with one of the first color filter and the second color filter.

18. The semiconductor device according to claim 14, wherein each of the first color filter and the second color filter is one of a red color filter, a green color filter, and a blue color filter.

19. The semiconductor device according to claim 14, wherein a photoelectric conversion layer of each of the plurality of photo sensors includes an amorphous semiconductor layer or a microcrystalline semiconductor layer.

* * * * *

UNITED STATES PATENT AND TRADEMARK OFFICE
CERTIFICATE OF CORRECTION

| | | |
|---|---|---|
| PATENT NO. | : 8,736,587 B2 | Page 1 of 1 |
| APPLICATION NO. | : 12/495984 | |
| DATED | : May 27, 2014 | |
| INVENTOR(S) | : Yamazaki | |

It is certified that error appears in the above-identified patent and that said Letters Patent is hereby corrected as shown below:

In the Specification:

Column 3, line 20, "color filter a second" should read --color filter, a second--

Column 3, line 32, "above or below," should read --above or below;--

Column 3, line 52, "when Output" should read --when output--

Column 5, lines 34-35, "color filter 11R" should read --color filter 18R--

Column 7, line 30, "backlight a" should read --backlight, a--

Column 7, line 41, "FIG, 2B," should read --FIG. 2B,--

Column 8, line 16, "transistor photo sensor" should read --transistor, photo sensor--

Column 11, lines 34-35, "silicon oxide film ($SIO_x$)" should read
--silicon oxide film ($SiO_x$)--

Column 13, line 8, "Si-N," should read --Si-H,--

Column 15, line 47, "insulator" should read --insulator.--

Column 17, line 2, "for scaling" should read --for sealing--

Column 21, line 26, "illuminance region the" should read --illuminance region, the--

Signed and Sealed this
Eleventh Day of November, 2014

Michelle K. Lee
*Deputy Director of the United States Patent and Trademark Office*